United States Patent
Yada

(10) Patent No.: US 8,061,615 B2
(45) Date of Patent: Nov. 22, 2011

(54) DETECTION METHOD OF TWO-DIMENSIONAL CODE, DETECTION DEVICE FOR THE SAME, AND STORAGE MEDIUM STORING DETECTION PROGRAM FOR THE SAME

(75) Inventor: Shinichi Yada, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1042 days.

(21) Appl. No.: 11/523,570

(22) Filed: Sep. 20, 2006

(65) Prior Publication Data

US 2007/0071320 A1 Mar. 29, 2007

(30) Foreign Application Priority Data

Sep. 20, 2005 (JP) .................................. 2005-272915
Sep. 27, 2005 (JP) .................................. 2005-280798

(51) Int. Cl.
*G09K 5/04* (2006.01)
(52) U.S. Cl. ........... 235/462.08; 235/462.09; 235/462.1; 235/462.11; 235/494
(58) Field of Classification Search ............. 235/462.09, 235/462.1, 462.11
See application file for complete search history.

(56) References Cited

U.S. PATENT DOCUMENTS

| | | | |
|---|---|---|---|
| 5,276,315 A | 1/1994 | Surka | |
| 5,319,181 A | 6/1994 | Shellhammer et al. | |
| 5,365,048 A | 11/1994 | Komiya et al. | |
| 5,686,718 A | 11/1997 | Iwai et al. | |
| 5,691,527 A | 11/1997 | Hara et al. | |
| 5,726,435 A | 3/1998 | Hara et al. | |
| 5,951,056 A | 9/1999 | Fukuda et al. | |
| 6,116,507 A * | 9/2000 | Fukuda et al. | ................. 235/454 |
| 6,181,839 B1 | 1/2001 | Kannon et al. | |
| 6,267,296 B1 | 7/2001 | Ooshima et al. | |

(Continued)

FOREIGN PATENT DOCUMENTS

EP 0 672 994 9/1995

(Continued)

OTHER PUBLICATIONS

"Information Technology-Automatic Identification and Data Capture Techniques-QR Code 2005 Bar Code Symbology Specification," Sep. 1, 2006, 2$^{nd}$ Edition, International Standard ISO/IEC 18004.

(Continued)

*Primary Examiner* — Thien M. Le
*Assistant Examiner* — Christopher Stanford
(74) *Attorney, Agent, or Firm* — Oliff & Berridge, PLC

(57) ABSTRACT

A method for detecting a two-dimensional code in which three position detection patterns are provided in positions corresponding to respective apices of a right angled isosceles triangle, and a data region is provided in a region defined by the position detection patterns is provided. The method includes detecting plural position detection patterns included in an image; identifying center points of the detected position detection patterns; selecting, from among the center points that positions are identified, three center points that constitute apices of a right angled isosceles triangle; extracting a feature as a two-dimensional code from a two-dimensional code region defined by the position detection patterns corresponding to the selected center points, or the peripheral region thereof; and in case where the feature as a two-dimensional code is extracted, determining that a two-dimensional code exists in the two-dimensional code region.

19 Claims, 40 Drawing Sheets

U.S. PATENT DOCUMENTS

| | | | |
|---|---|---|---|
| 6,394,349 | B1 | 5/2002 | Shigekusa et al. |
| 6,612,497 | B1 | 9/2003 | Iida et al. |
| 6,678,412 | B1 | 1/2004 | Shigekusa et al. |
| 6,685,095 | B2 | 2/2004 | Roustaei et al. |
| 6,722,565 | B2 | 4/2004 | Takeuchi et al. |
| 6,729,542 | B2 | 5/2004 | Iwai et al. |
| 6,863,218 | B2 | 3/2005 | Muramatsu |
| 6,918,539 | B2 | 7/2005 | Nakajima et al. |
| 7,611,059 | B2 * | 11/2009 | Kobayashi et al. ...... 235/462.07 |
| 2002/0051573 | A1 | 5/2002 | Sakai et al. |
| 2004/0011872 | A1 | 1/2004 | Shimizu |
| 2005/0121520 | A1 | 6/2005 | Yamaguchi et al. |
| 2005/0279832 | A1 | 12/2005 | Kobayashi et al. |
| 2007/0069026 | A1 | 3/2007 | Aoyama |
| 2007/0071320 | A1 | 3/2007 | Yada |

FOREIGN PATENT DOCUMENTS

| | | |
|---|---|---|
| JP | A 6-12515 | 1/1994 |
| JP | A 60-12515 | 1/1994 |
| JP | A-07-141458 | 6/1995 |
| JP | B2 2938338 | 6/1999 |
| JP | A 2000-337853 | 12/2000 |
| JP | A 2001-043307 | 2/2001 |
| JP | A 2001-256425 | 9/2001 |
| JP | A-2004-213061 | 7/2004 |
| JP | A-2005-018579 | 1/2005 |
| KR | 10-2004-0004233 A | 1/2004 |
| KR | 10-2004-0057175 A | 7/2004 |

OTHER PUBLICATIONS

"Two Dimensional Symbol—QR Code—Basic Specification," JIS X-0510 Standard Specification, 1999, pp. 1626-1726.

Jun. 8, 2010 Office Action issued in Japanese patent application No. 2005-272915 (with translation).

U.S. Appl. No. 11/523,606, filed on Sep. 20, 2006.

Sep. 20, 2007 Office Action issued in U.S. Appl. No. 11/523,606.

May 14, 2008 Office Action issued in U.S. Appl. No. 11/523,606.

Dec. 23, 2008 Office Action issued in U.S. Appl. No. 11/523,606.

Jul. 31, 2009 Notice of Allowance issued in U.S. Appl. No. 11/523,606.

Sep. 30, 2009 Notice of Allowance issued in U.S. Appl. No. 11/523,606.

* cited by examiner

SCAN LINE FOR DETERMINING WHETHER A QUIET ZONE EXISTS

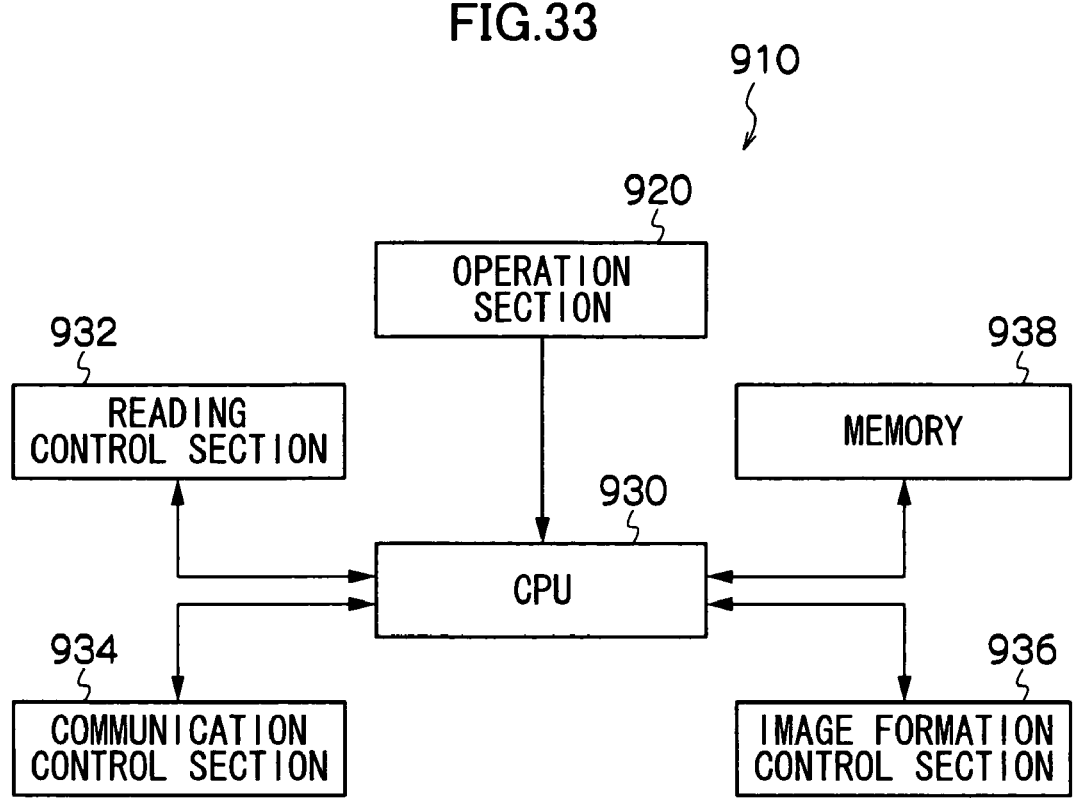

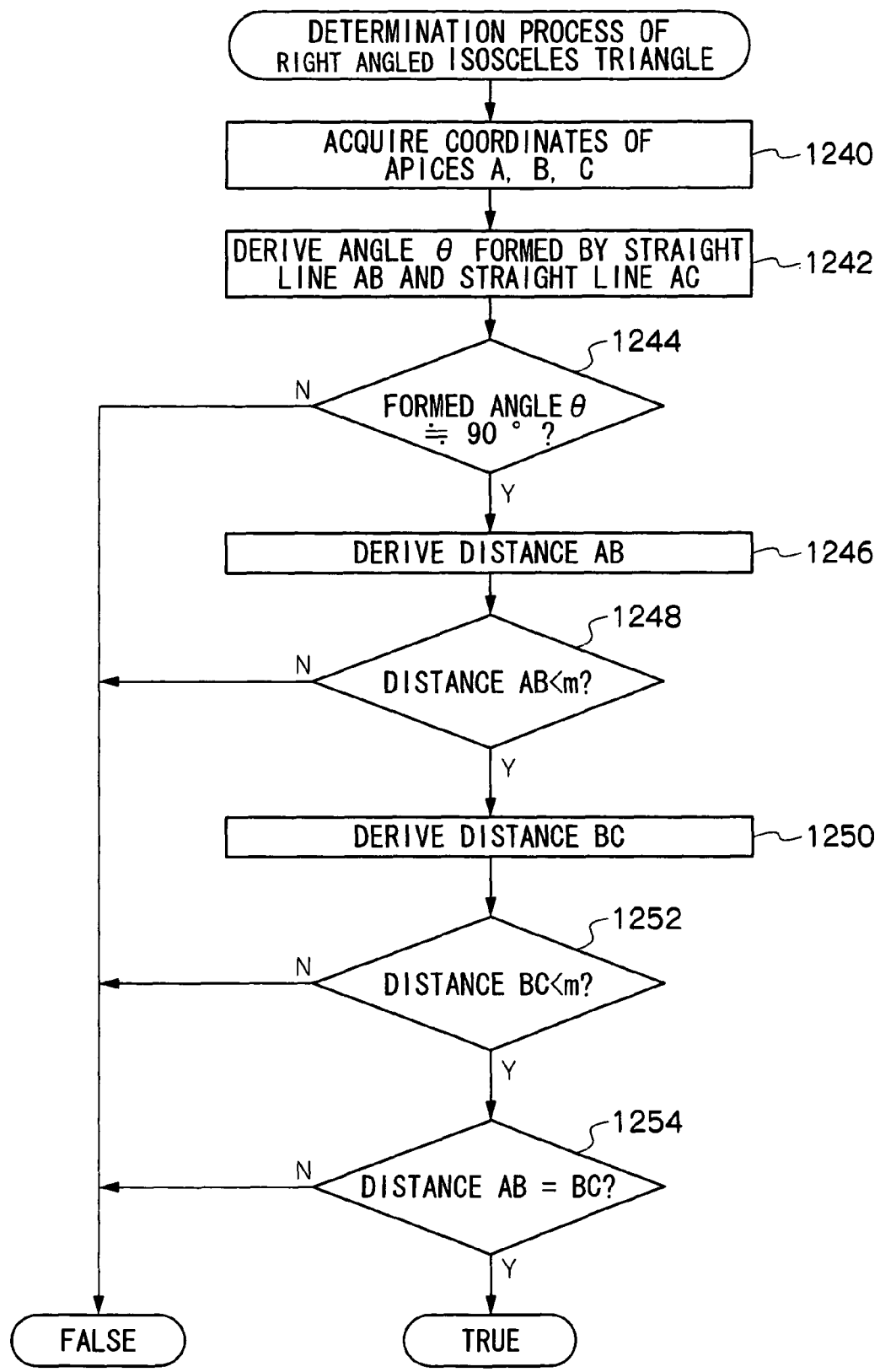

DETECTION METHOD OF TWO-DIMENSIONAL CODE, DETECTION DEVICE FOR THE SAME, AND STORAGE MEDIUM STORING DETECTION PROGRAM FOR THE SAME

BACKGROUND

1. Technical Field

The present invention relates to a detection method of two-dimensional code, a detection device for the same, and a storage medium which stores a detection program for the same, and particularly relates to a method for detecting a two-dimensional code from an image including a two-dimensional code, a device for the same, and a storage medium which stores a program for the same, as well as a detection method for optically readable two-dimensional code and a detection device for the same.

2. Related Art

In recent years, as an optically readable code, a two-dimensional code (two-dimensional barcode) in which coded information is arranged on a matrix to provide a pattern has been in wide spread use.

A barcode which represents data by a combination of vertical lines having different widths and/or spacings is being widely used in the world for such an application as information management of merchandises. The barcode is a 1-dimensional code in which vertical lines are arranged in one direction. Recently, because of the large amount of information which can be represented, utilization of two-dimensional codes has become popularized. The two-dimensional code is a code in which data represented by a binary code is cellularized to be disposed on a two-dimensional matrix as a pattern.

Conventionally, as the above-mentioned two-dimensional code, a two-dimensional code, so-called a QR code, in which, in each of at least two predetermined positions in the matrix, symbols for positioning a pattern, in which a scan line crossing the center thereof at any angle gives the same frequency component ratio is disposed, is proposed.

For example, given contents of a paper document are converted into a two-dimensional code, and in the margin of that paper document, the two-dimensional code may be attached. Thereby, when the paper document is scanned, the attached two-dimensional code can be recognized to be decoded, and the given contents of that paper document can be acquired as electronic data without using an optical character reader (OCR) or the like.

The symbol of the QR code is formed of modules disposed in a square as shown in FIG. 3, and is configured to include an encoding region which is used for encoding of data, and a function pattern, such as a position finder pattern, or the like. The position finder pattern is a function pattern composed of three position detection patterns which are disposed at three corners of the symbol. The center points of the position detection patterns constitute a right angled isosceles triangle, in which the respective center points providing the apices. In addition, around the four sides of the symbol, a margin region called quiet zone is provided.

When the QR code is decoded, a special QR code reader is used to scan the symbol for optically reading it; detect the QR code from the image read; and decode the QR code detected. In order to detect the QR code, the three position detection patterns are detected, and all the coordinates of the center points of those position detection patterns are calculated. With the coordinates of the center points of the position detection patterns being identified, positions of the position finder patterns are determined, and the QR code is detected.

In addition, as the two-dimensional code reading method, a method which involves detecting at least one of code words for two-dimensional code including start and stop code words, thereby determining the orientation of the two-dimensional code symbol in the image data for scanning the two-dimensional code in consideration of the pertinent orientation is proposed.

Although the two-dimensional code as described above can express rather large amount of information as compared with the 1-dimensional code, the amount of information is still restricted. Thus, in case of representing a large amount of information with a QR code, the information is divided into plural QR codes. Conventionally, when the QR codes in this structured append mode are decoded, the symbols are read one by one and the plural QR codes are decoded sequentially.

When reading and decoding plural two-dimensional code which are formed on one document, two methods can be considered: a method of reading, by a special code reader, the two-dimensional codes one by one for decoding them respectively; and a method of reading, by a multi-function machine or the like, the entire one document, and from the obtained image data, detecting plural two-dimensional codes for decoding.

SUMMARY

An aspect of the present invention is a method for detecting a two-dimensional code of three position detection patterns provided in positions corresponding to respective apices of a right angled isosceles triangle, and a data region is provided in a region defined by the position detection patterns, the method comprising: detecting a plurality of position detection patterns included in an image; identifying positions of the center points of the detected position detection patterns; selecting three center points that constitute apices of a right angled isosceles triangle from among the identified center point positions; extracting for a feature of a two-dimensional code from a two-dimensional code region defined by the position detection patterns corresponding to the selected center points, or a peripheral region thereof; and determining whether a two-dimensional code exists in the two-dimensional code region when the feature of a two-dimensional code is extracted.

BRIEF DESCRIPTION OF THE DRAWINGS

FIG. 33 is a block diagram schematically illustrating an electrical configuration of the multi-function machine pertaining to the fourth to sixth embodiments;

FIG. 38 is a flowchart illustrating a flow of a determination process for right angled isosceles triangle considering a condition of size of a QR code that is performed by a detection process program pertaining to the fifth embodiment;

DETAILED DESCRIPTION

Here, with reference to the drawings, an exemplary embodiment of the present invention will be described in detail. Herein, an example using a "QR code" as a two-dimensional code will be described.

For this QR code, the basic specification is standardized by JIS (JIS-X-0510), and the whole text of the specification as given in this JIS Standard (JIS-X-0510) is incorporated in the disclosure of the present specification by reference.

Figure 3:
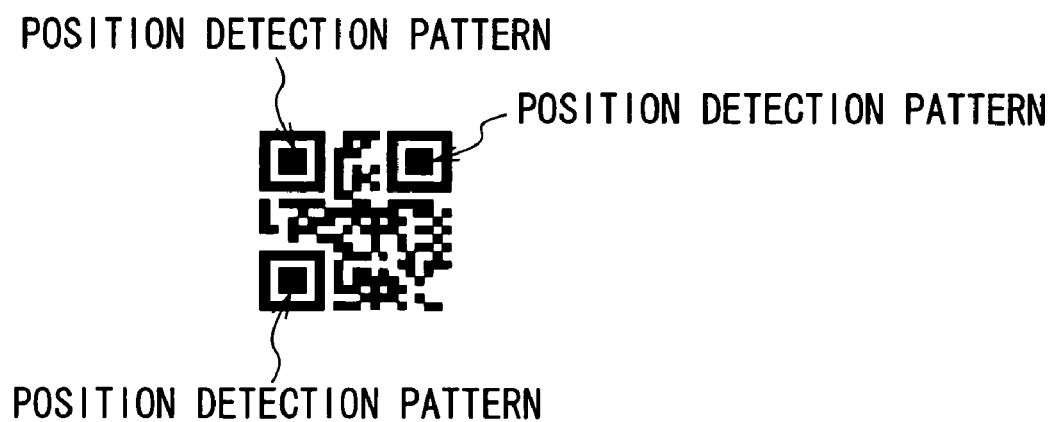
FIG. 3 is a schematic diagram illustrating a structure of a QR code.
Figure 4:
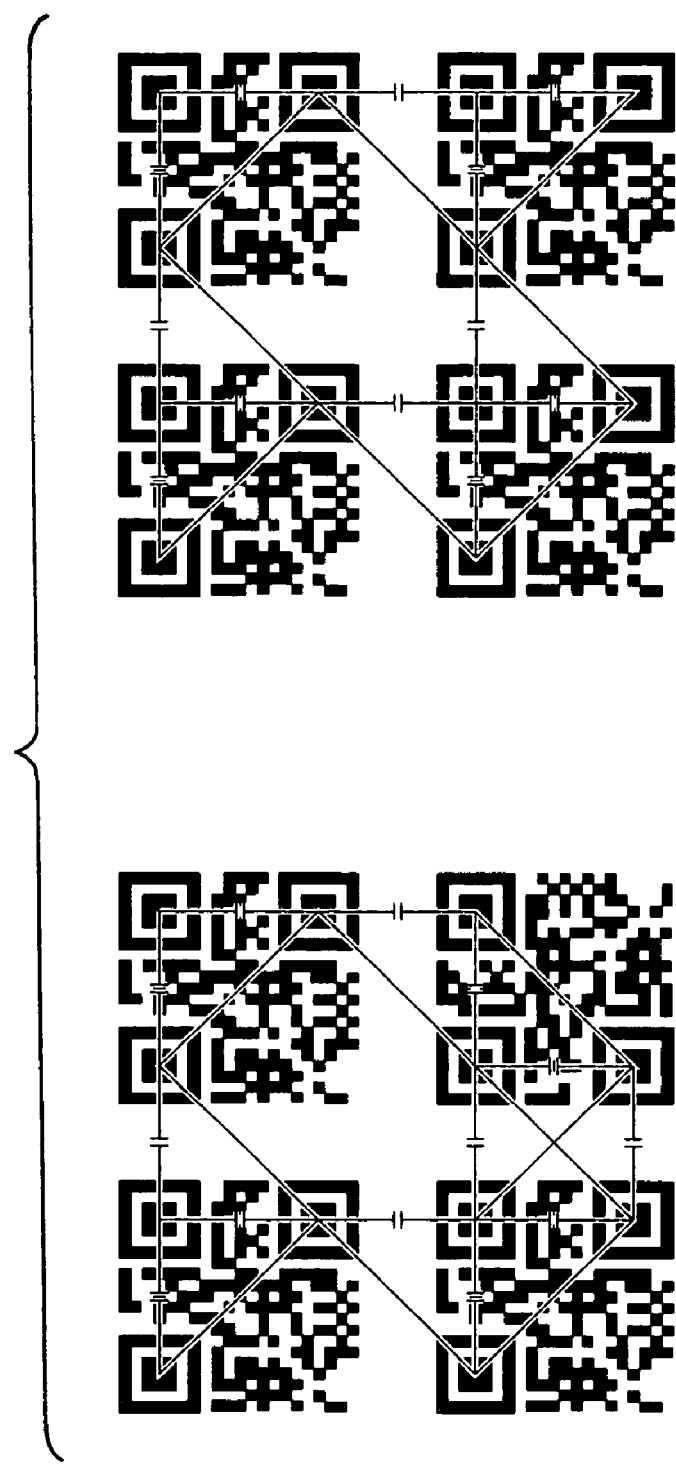
FIG. 4 is a drawing showing position detection patterns included in different symbols are combined.

As described above, the symbol of the QR code is made up of modules disposed in a square as shown in FIG. 3, and is configured to include an encoding region to be used for encoding of data, and a function pattern, such as a position finder pattern, or the like. The position finder pattern is a function pattern composed of three position detection patterns which are disposed at three corners of the symbol. The center points of the position detection patterns constitute a right angled isosceles triangle, the respective center points providing the apices thereof. In addition, around the four sides of the symbol, a margin region called a quiet zone is provided.

In case where the QR code is decoded, the symbol is scanned and optically read by a special QR code reader; the QR code is detected from the read image; and the detected QR code is decoded. In order to detect the QR code, three position detection patterns are detected, and all coordinates of center points of those position detection patterns are calculated. Calculation of the coordinates of the center points is performed in accordance with the method given on p. 65-66 of the JIS Standard (JIS-X-0510). With the coordinates of the center points of the position detection patterns being identified, the positions of the position finder pattern is determined, and the QR code is detected.

In addition, as stated in paragraph 5.3.2.7 "Structured Append mode" on p. 22 in the above-mentioned JIS Standard, in cases where a large amount of information is represented with a QR code, the information is divided into plural QR codes for representation.

First Embodiment

Figure 1:
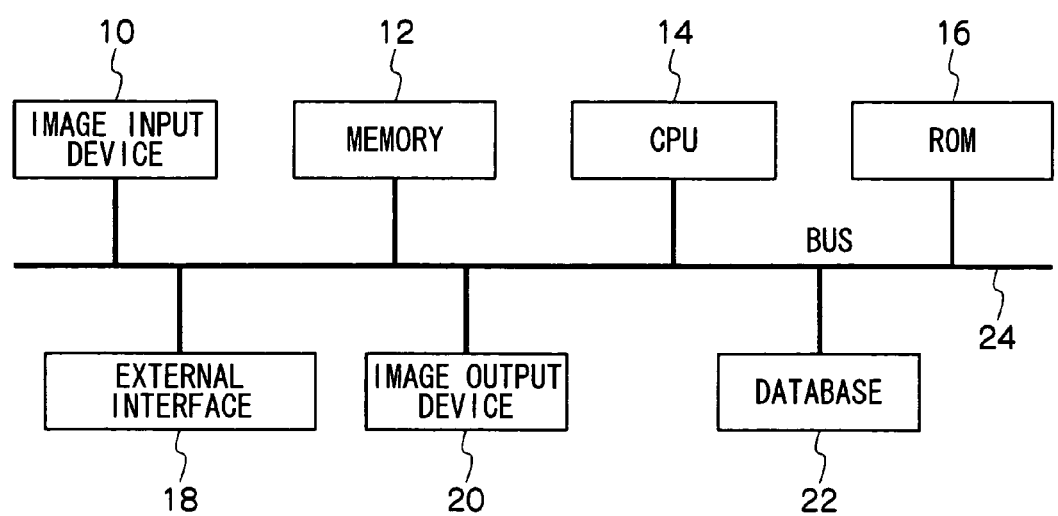
FIG. 1 is a block diagram illustrating a schematic configuration of a QR code processing device pertaining to a first embodiment of the present invention.

FIG. 1 is a block diagram illustrating the schematic configuration of a QR code processing device pertaining to the present embodiment. In this device, the present invention is applied to the detection of QR codes from image data. As shown in FIG. 1, this processing device includes an image input device 10 which acquires raster image data from a document image. The image input device 10 is constituted by a scanner, a digital camera, or the like, for reading the document image from a paper document. In case where plural QR codes are attached to a paper document, the image input device 10 acquires raster image data including the plural QR codes.

In addition, the processing device includes: a memory 12 which holds the raster image data acquired by the image input device 10 and functions as a working area; a CPU 14 which reads programs and performs various processes; an ROM 16 which stores programs for performing a detection process and a decoding process for a QR code, and the like; an external interface 18 for connecting to another computer via a network; an image output device 20 such as a printer, or the like; and a database 22 which accumulates the document data related to the data obtained by decoding a QR code.

The image input device 10, memory 12, CPU 14, ROM 16, external interface 18, image output device 20, and database 22 are connected to each other by a data bus 24.

Figure 2:
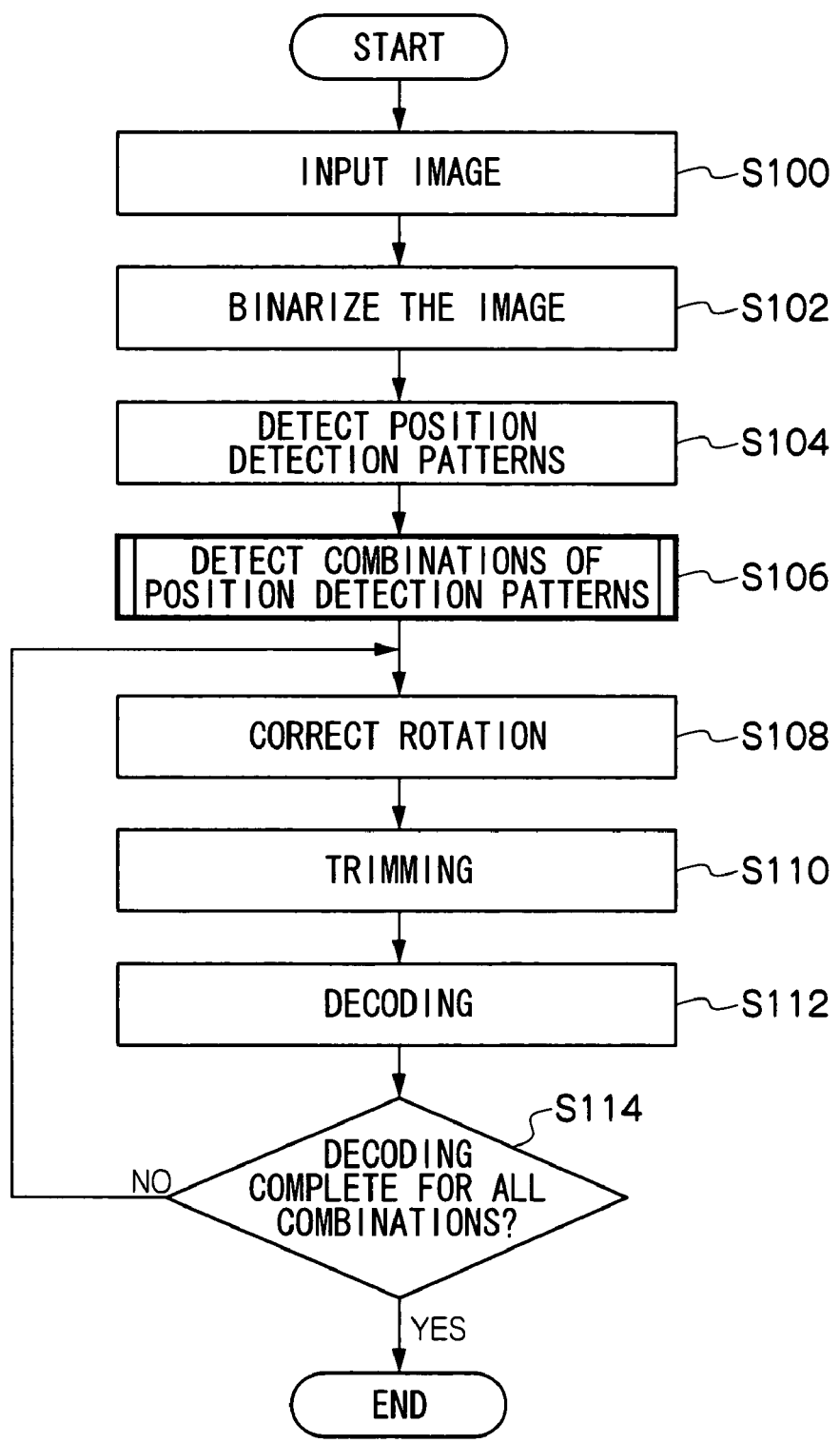
FIG. 2 is a flowchart illustrating a processing routine performed by a CPU.

Next, a procedure for acquiring raster image data including plural QR codes with the above-mentioned processing device, and decoding each of the plural QR codes will be described. FIG. 2 is a flowchart illustrating a processing routine which is performed by the CPU 14.

First, at step 100, the raster image data is acquired from the image input device 10, and held in the memory 12. At the next step 102, the image data is binarized in the memory 12. The binarization method may be a simple binarization using a threshold, or any other binarization method. At the next step 104, from the binarized raster image data, all of the coordinates of the center points (hereinafter called "center coordinates") of the position detection patterns of the QR code are detected, and the detected coordinates of the center points are listed and held in the memory 12. As the detection method, conventional method described in the JIS Standard (JIS-X-0510), for example, can be used.

Next, at step 106, "combination detection process" which detects combination of three position detection patterns which are included in the same symbol is performed. At step 104, the coordinates of the center points of the position detection patterns are detected and listed. At the time of listing, it is unknown which three of the combinations are included in the same symbol. By detecting the combination of three position detection patterns, which are included in the same symbol, from among this list, the position of the position finder pattern of the respective symbols is determined and the QR code is detected.

Figure 10:
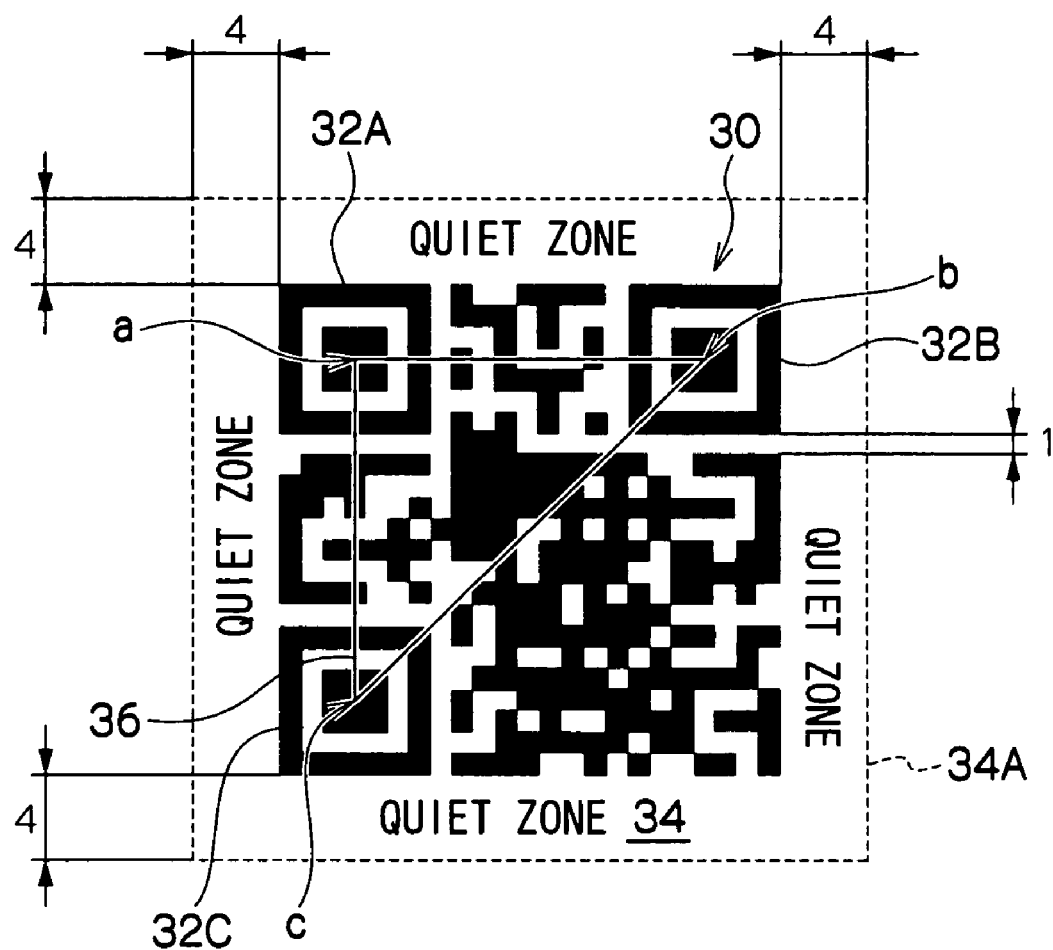
FIG. 10 is a drawing illustrating a structure of the symbol of a QR code.

Here, an outline of the "combination detection process" will be briefly described. FIG. 10 is a drawing illustrating a structure of a symbol of a QR code. As shown in FIG. 10, the symbol 30 of the QR code has three position detection patterns 32A, 32B, and 32C. The center points a, b, and c of these position detection patterns 32A, 32B, and 32C constitute a right angled isosceles triangle 36, providing the respective apices, as shown in the figure. In addition, around the four sides of the symbol 30, a margin region 34 where no representations exist (which is hereinafter called "quiet zone") is provided. The outer periphery 34A of the quiet zone 34 is indicated with a dotted line. According to the JIS Standard, the width of the quiet zone 34 is specified to be 4 modules. The term "module" refers to a unit square representing one bit of information in the QR code.

In the present embodiment, the combination is detected by utilizing the feature of the symbol as described above. Specifically, combinations of the coordinates of the center points of three position detection patterns that constitute right angled isosceles triangles are detected, and it is determined whether a quiet zone exists around those three coordinates. And, in case where a quiet zone exists, it can be determined that a combination is that of three position detection patterns which are included in the same symbol. The detail of the combination detection process will be described later.

At step 106, when all of the combinations of the position detection patterns have been detected, then one combination set is selected from among them, and the QR code pertaining to that combination is decoded. In other words, first at step 108, one combination set is selected, and from the coordinates of the center points of the position detection patterns, the rotated angle of the symbol is computed. On the basis of the rotated angle computed, orientation of the symbol is corrected, and the QR code is brought into the state in which it is in the correct orientation with respect to the reference coordinates. At the next step 110, the symbol for which the orientation has been corrected is trimmed and held in the memory 12. At the next step 112, the encoding region of the symbol is decoded. As the decoding method, a conventional method, for example as described in the JIS Standard (JIS-X-0510), can be used.

Next, at step 114, it is determined whether the QR code has been decoded for all of the detected combinations. Here, when the determination is affirmative, the routine is terminated, and when the determination is negative, the routine returns to step 108, another one set of the combination is selected, and the processes of step 108 to step 112 are repeated. In other words, as a result of the combination detection, in case where plural combinations are detected, the processes of rotation correction, trimming, and decoding are performed for all of the combinations.

In addition, with the above-mentioned processing device, various processes can be carried out on the basis of the decoded data. For example, in case where the decoded data is an ID number for identifying documents accumulated in the database 22 (which is hereinafter called "document ID"), this document ID can be used as a search key to search the database 22 for acquiring a main body of document data from the database 22. And, the acquired document data can be printed out using the image output device 22. In addition, the obtained document data can be transferred to another computer via the external interface 18.

Here, the detail of the "combination detection process" which is performed at step 106 in FIG. 2 will be described. As described above, this process is performed after all of the coordinates of the center points of the position detection patterns having been detected and listed. Since the symbol of one QR code includes three position detection patterns, in a case where N QR codes are given, 3N sets of coordinates are listed.

Figure 5:
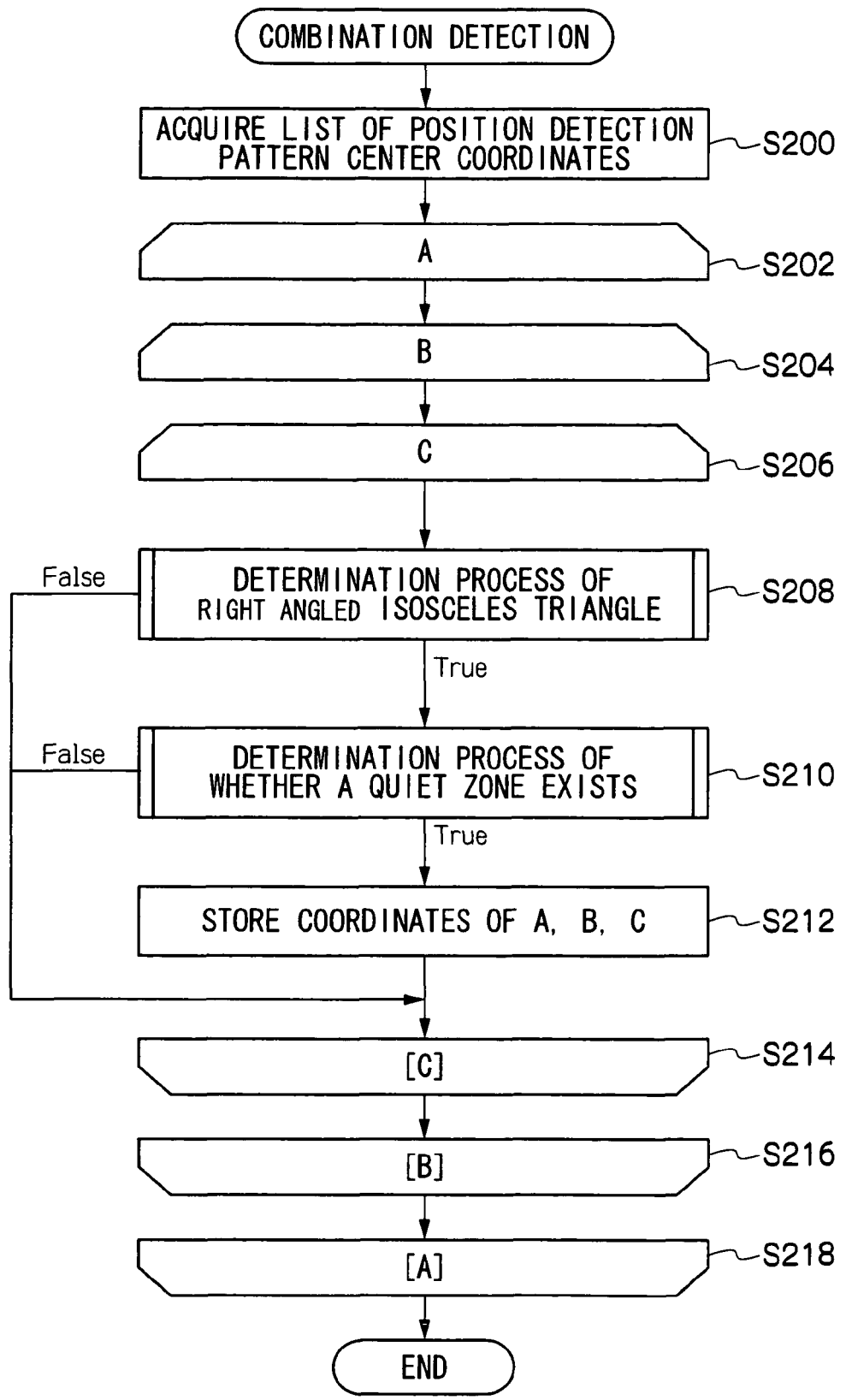
FIG. 5 is a flowchart illustrating a subroutine of combination detection process.

FIG. 5 is a flowchart illustrating a subroutine of the combination detection process. First, at step 200, the coordinates list of the center points held in the memory 12 is referenced. If the center points of the three position detection patterns constituting a position finding pattern are designated A, B, and C, then at step 202 to step 206, three sets of coordinates are selected from the coordinates list that correspond to the center points A, B, C.

Sets of three are selected from the 3N coordinates, in all of the possible combinations thereof, to form combinations. The number of combinations can be found by calculating the number of combinations of 3 from 3N as shown in the following equation.

$$_{3N}C_3 = \frac{(3N)!}{3!(3N-3)!}$$

For example, if two QR codes are given, the number of position detection patterns is 2N=6, and the number of combinations selecting 3 from 6 is 20. If 10 QR codes are given, the number of combinations will be 4060.

Next, at step 208, a "determination process of right angled isosceles triangle" is performed. In such determination process, it is determined whether the center points A, B, C identified by the selected three sets of coordinates constitute respective apices of a right angled isosceles triangle. When the determination is affirmative (true), since there is a possibility that the center points A, B, C constitute the respective apices of a right angled isosceles triangle, and the three position detection patterns are included in the same symbol, the routine proceeds to a "determination process of whether a quiet zone exists" at the next step 210.

At step 210, from the selected three sets of coordinates, a region where the symbol of the QR code may exist (a candidate region) is hypothesized, and it is determined whether the quiet zone exists around the candidate region. When the determination is affirmative (true), there is an extremely high possibility that a quiet zone exists around the candidate region, and a symbol exists in the candidate region. Thus, at step 212, the selected three sets of coordinates are listed as a group of coordinates representing a position of a position finder pattern, and stored in the memory 12. In other words, it is determined that the position detection patterns corresponding to the selected three sets of coordinates are included in the same symbol, and constitute a position finder pattern, and the combination of the pertinent coordinates is stored in the memory 12.

Misrecognition of a position detection pattern can be caused by various factors. For example, noise included in the raster image data may be misrecognized as a position detection pattern. In addition, even if the center points A, B, C constitute respective apices of a right angled isosceles triangle, position detection patterns which are included in different symbols may have been combined. However, the symbol of the QR code has a feature that a quiet zone is provided around the four sides thereof. Therefore, as in the present embodiment, by determining whether a quiet zone exists around the candidate region, combining the position detection patterns which are included in different symbols, and misrecognizing the position detection patterns as a position finder pattern can be prevented.

The combinations of position detection patterns (the combinations of three sets of coordinates) which are included in the same symbol are identified one after another.

On the other hand, at step 208 or step 210, when the determination is negative (false), it is verified, at step 214 to step 218, whether all of the combinations have been selected, and if all of the combinations have been selected, the routine is terminated. Here, in case where there is a combination which has not been selected, the routine returns to step 202 to step 206, and a different combination of three sets of coordinates is selected from the coordinates list, being associated with the center points A, B, C. Then, for the new combination, the processes of step 208 to step 212 are repeated.

Figure 7:
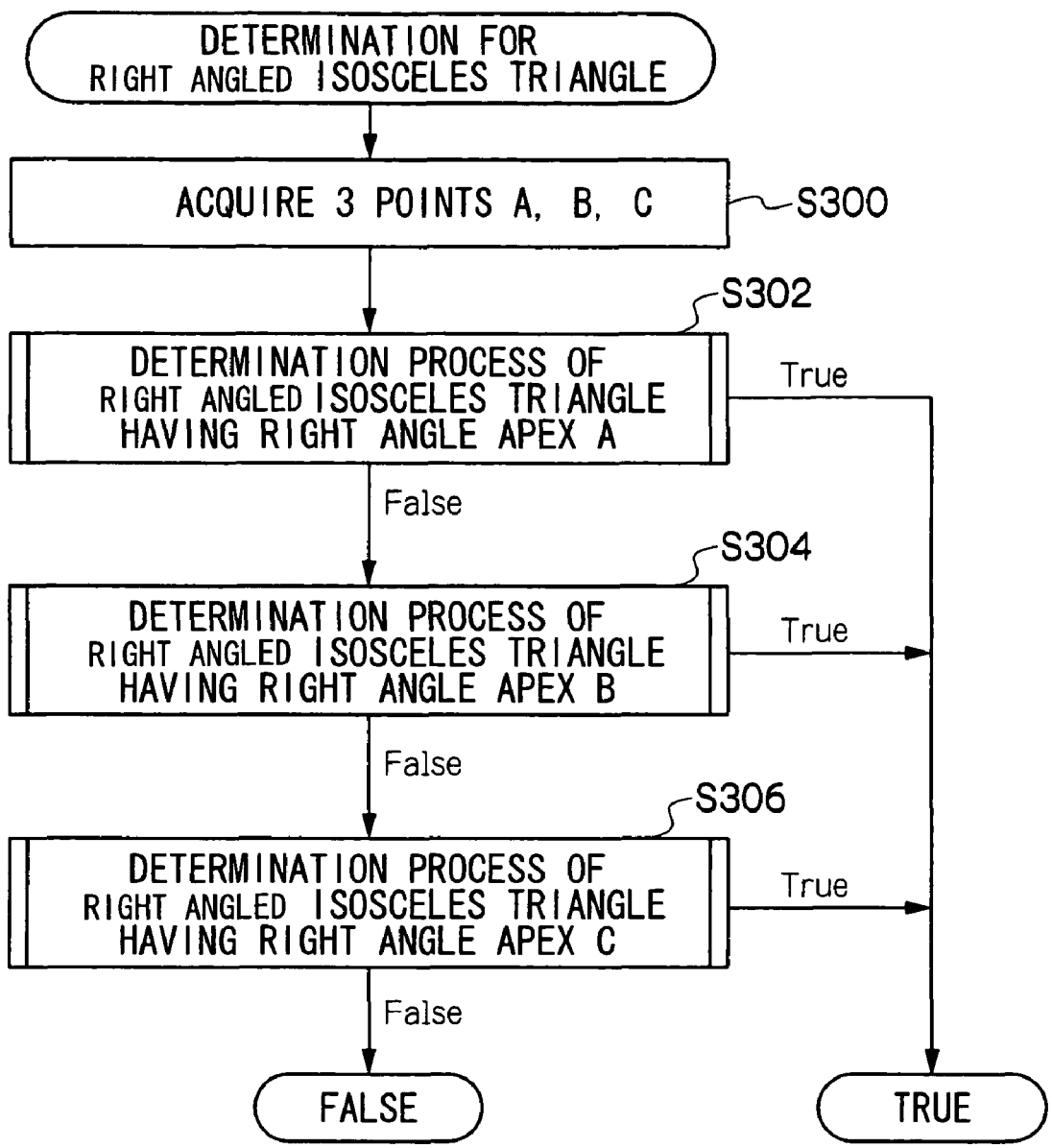
FIG. 7 is a flowchart illustrating a routine of determination process for right angled isosceles triangle.

Here, the "determination process of right angled isosceles triangle" which is performed at step 208 in FIG. 5 will be described in detail. FIG. 7 is a flowchart illustrating a routine for determination process of right angled isosceles triangle.

First, at step 300, the selected three sets of coordinates are acquired, and at step 302, it is determined whether the center point A can become a right angle apex of a right angled isosceles triangle. When the determination is affirmative (true) at step 302, it is determined that the center points A, B, C constitute respective apices of a right angled isosceles triangle (true). On the other hand, when the determination is negative (false) at step 302, the routine proceeds to the next step 304 for determining whether the center point B can become a right angle apex of a right angled isosceles triangle.

At step 304, when the determination is affirmative (true), it is determined that the center points A, B, C constitute respective apices of a right angled isosceles triangle (true). On the other hand, at step 304, when the determination is negative (false), the routine proceeds to the next step 306 for determining whether the center point C can become a right angle apex of a right angled isosceles triangle.

At step 306, when the determination is affirmative (true), it is determined that the center points A, B, C constitute respective apices of a right angled isosceles triangle (true). On the other hand, at step 306, when the determination is negative (false), it is determined that the center points A, B, C do not constitute respective apices of a right angled isosceles triangle (false).

Figure 6:
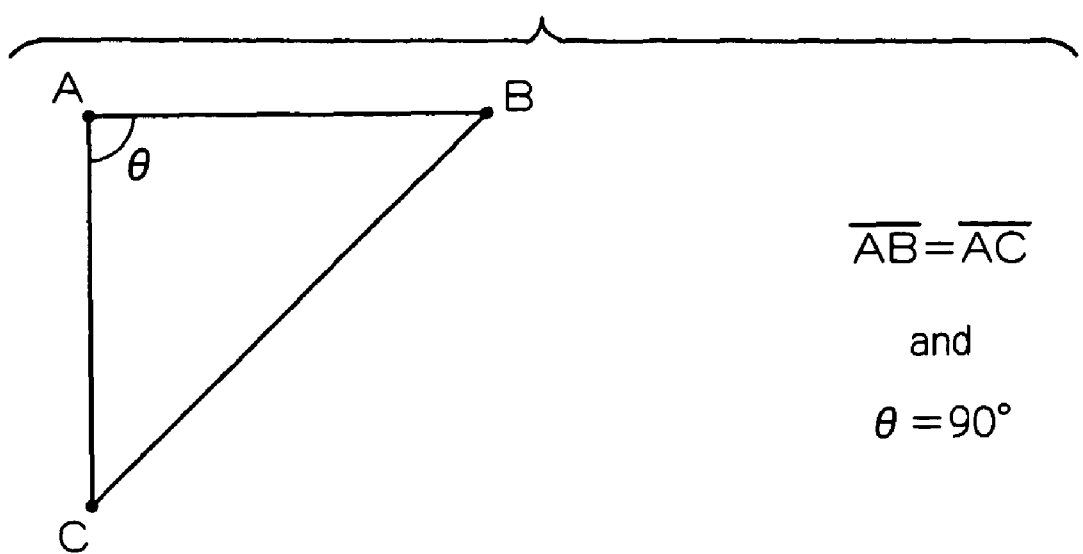
FIG. 6 is a drawing for explaining geometrical existence conditions for a right angled isosceles triangle.

Here, the "determination process of right angle apex" which is performed at steps 302 to 306 in FIG. 7 will be described in detail. FIG. 6 is a drawing explaining the geometrical conditions that exist for a right angled isosceles triangle. Further, FIG. 8 is a flowchart illustrating a routine for determination process of right angle apex that is performed at step 302 in FIG. 7.

As shown in FIG. 6, as conditions for a triangle having points A, B, C as respective apices thereof to be a right angled isosceles triangle having point A as a right angle apex, it is required that the angle θ formed by segment AB and segment AC be 90°, and the length of the segment AB be equal to that of the segment AC.

Figure 8:
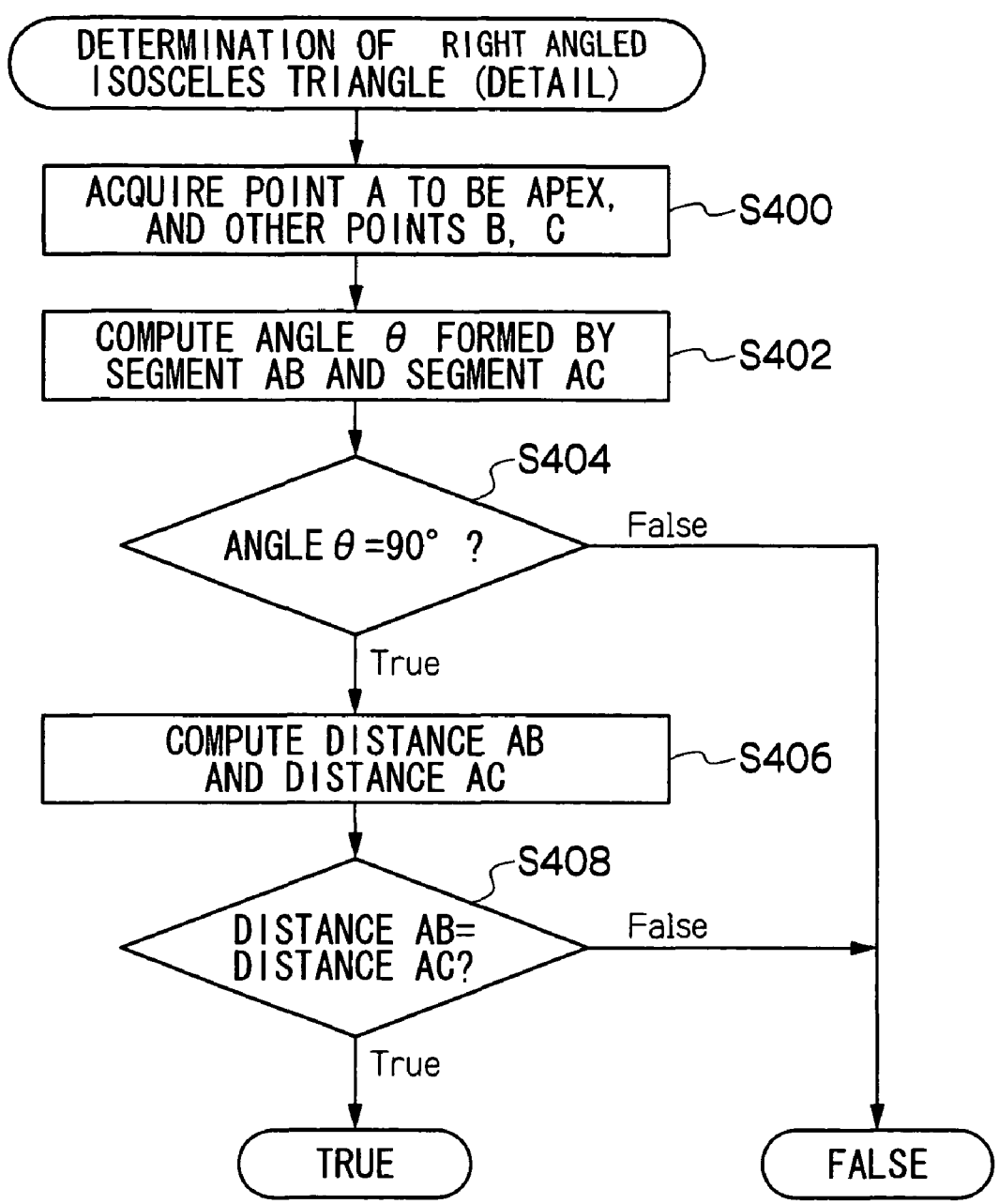
FIG. 8 is a flowchart illustrating a routine of determination process for right angle apex.

Therefore, first at step 400 in FIG. 8, the selected three sets of coordinates are acquired. At step 402, from the acquired coordinates, the angle θ formed by the segment AB and the segment AC is computed. At step 404, on the basis of the computation result, it is determined whether the angle θ is 90°. In other words, it is determined whether the inner product of a vector directing from the point A to the point B and a vector directing from the point A to the point C is zero. Here, when the determination is negative (false), it is determined that the triangle is not a right angled isosceles triangle having the center point A as the right angle apex (false). On the other hand, at step 404, when the determination is affirmative (true), the routine proceeds to the next step 406.

At step 406, from the acquired coordinates, the length of the segment AB and that of the segment AC respectively are computed. At step 408, on the basis of the computed result, it is determined whether the length of the segment AB is equal to that of the segment AC. Here, when the determination is a negative determination (false), it can be determined that the triangle is not a right angled isosceles triangle having the center point A as the right angle apex (false). On the other hand, when the determination is affirmative (true) at step 408, it can be determined that the triangle is a right angled isosceles triangle having the center point A as the right angle apex (true).

Figure 11:
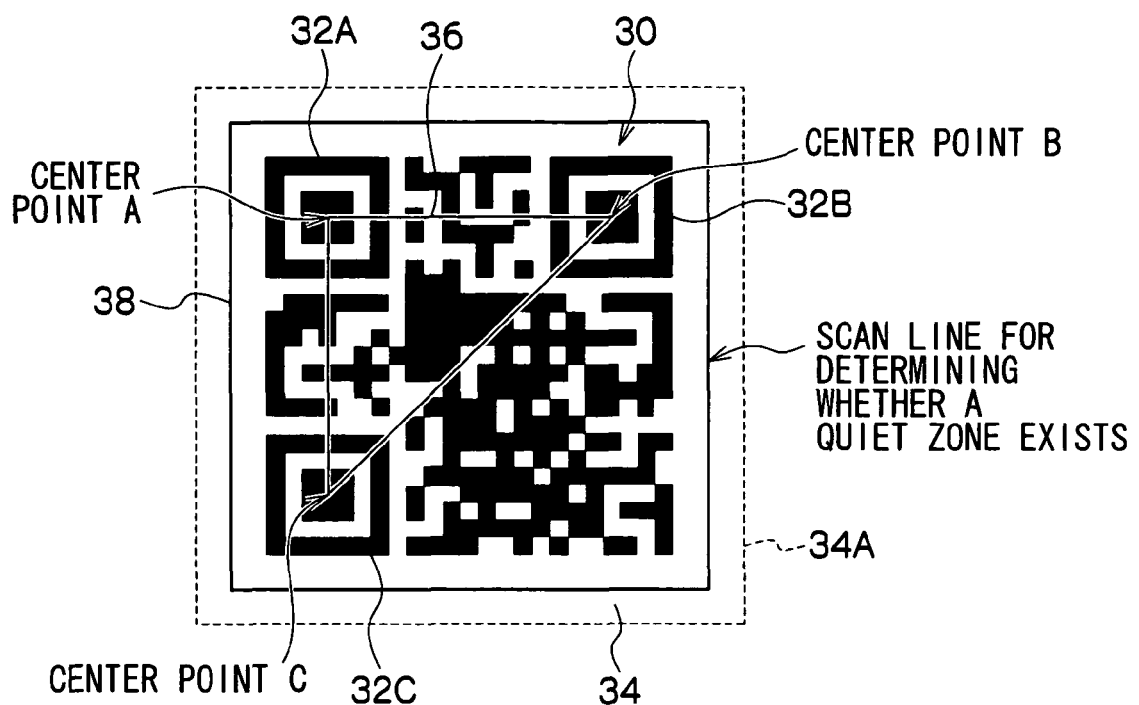
FIG. 11 is a drawing for explaining a determination method about whether or not a quiet zone exists.
Figure 18:
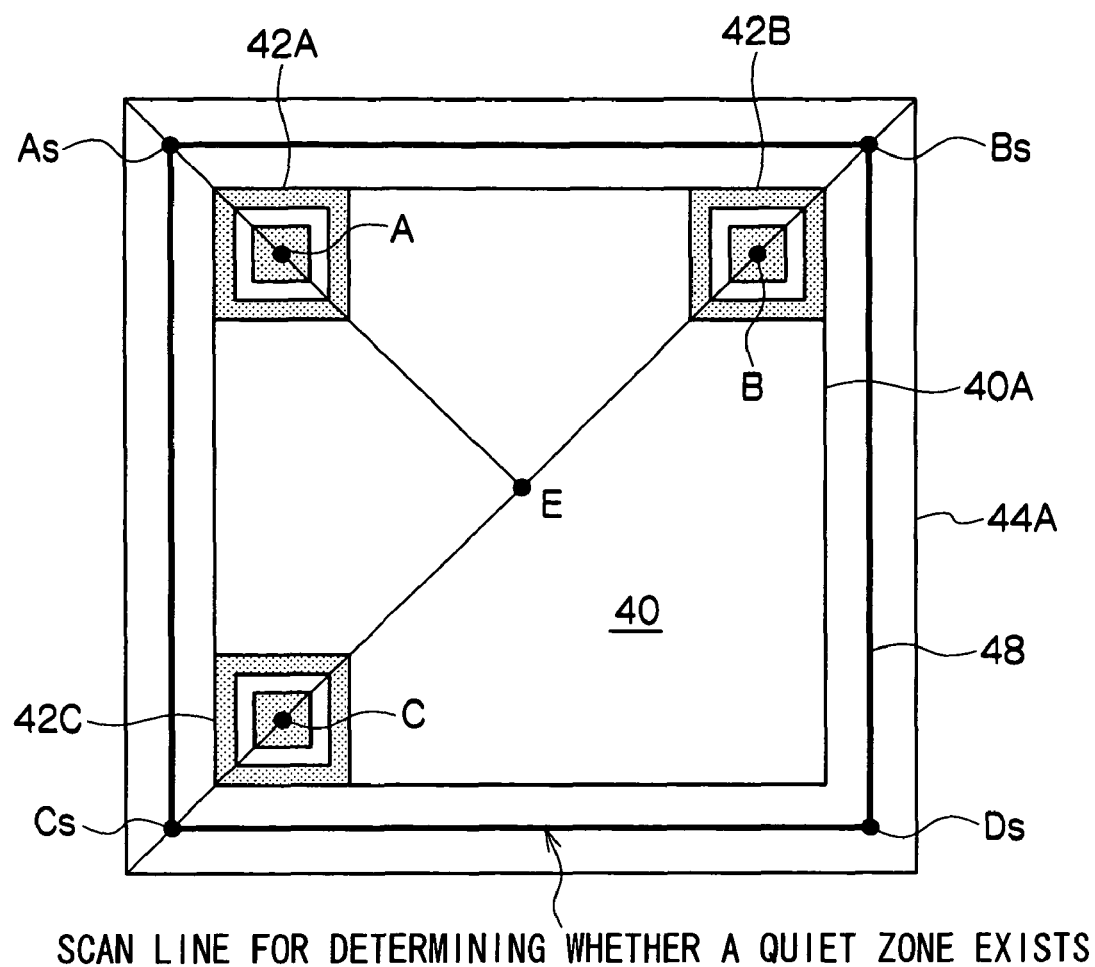
FIG. 18 is a drawing for explaining the determination method about whether or not a quiet zone exists.

Next, the "determination process of whether a margin region (a quiet zone) exists" which is performed at step 210 in FIG. 5 will be described in detail. FIG. 11 and FIG. 18 are drawings for explaining the determination method of whether a quiet zone exists.

As shown in FIG. 11, in case where a QR code exists, when a virtual line (scan line) 38 which is drawn in the quiet zone 34 of the symbol 30 is scanned, this scan line 38 is constituted by pixels which pixel values are all "white" (which are hereinafter called "white pixels"). A pixel which pixel value is "black" is called "black pixel". Further, since FIG. 11 includes the same configuration as that of the QR code shown in FIG. 10, except that the scan line 38 is shown, the same components are provided with the same references, and the explanation is omitted.

In the present embodiment, as shown in FIG. 18, the center points of the three position detection patterns 42A, 42B, 42C are designated A, B, C, and a region 40 where the symbol of the QR code may exist (a candidate region) is hypothesized.

In addition, it is hypothesized that a quiet zone exists around the candidate region 40, and an outer periphery 44A of the quiet zone is hypothesized. Further, a scan line 48 is set between the outer periphery 40A of the candidate region 40 and the outer periphery 44A of the quiet zone.

This scan line 48 is scanned. In other words, pixel values of the image data expanded in the memory are sequentially acquired. If the scan line 48 is composed of white pixels, it can be determined that a quiet zone exists around the candidate region 40. In other words, due to the feature of the QR code that a quiet zone exists around the symbol, there is an extremely high possibility that a symbol exists in the candidate region 40.

The scan line 48 may be set along, for example, the center line of the quiet zone. In other words, the scan line 48 may be set at the mid location between the outer periphery 40A and the outer periphery 44A. In case where the scan line 48 is set around the four sides of the candidate region 40 along the above-mentioned center line, the shape of the region surrounded by the scan line 48 is the same shape as that of the candidate region 40, i.e., a square. References of the scan line 48 are points $A_s$, $B_s$, $C_s$ on the extension lines extending from the center point E of the candidate region 40 in the directions toward the center points A, B, C, and point $D_s$ which constitutes an apex of the square together with the points $A_s$, $B_s$, $C_s$. The coordinates of the point $D_s$ can be calculated from the coordinates of the points $A_s$, $B_s$, $C_s$.

Figure 12:
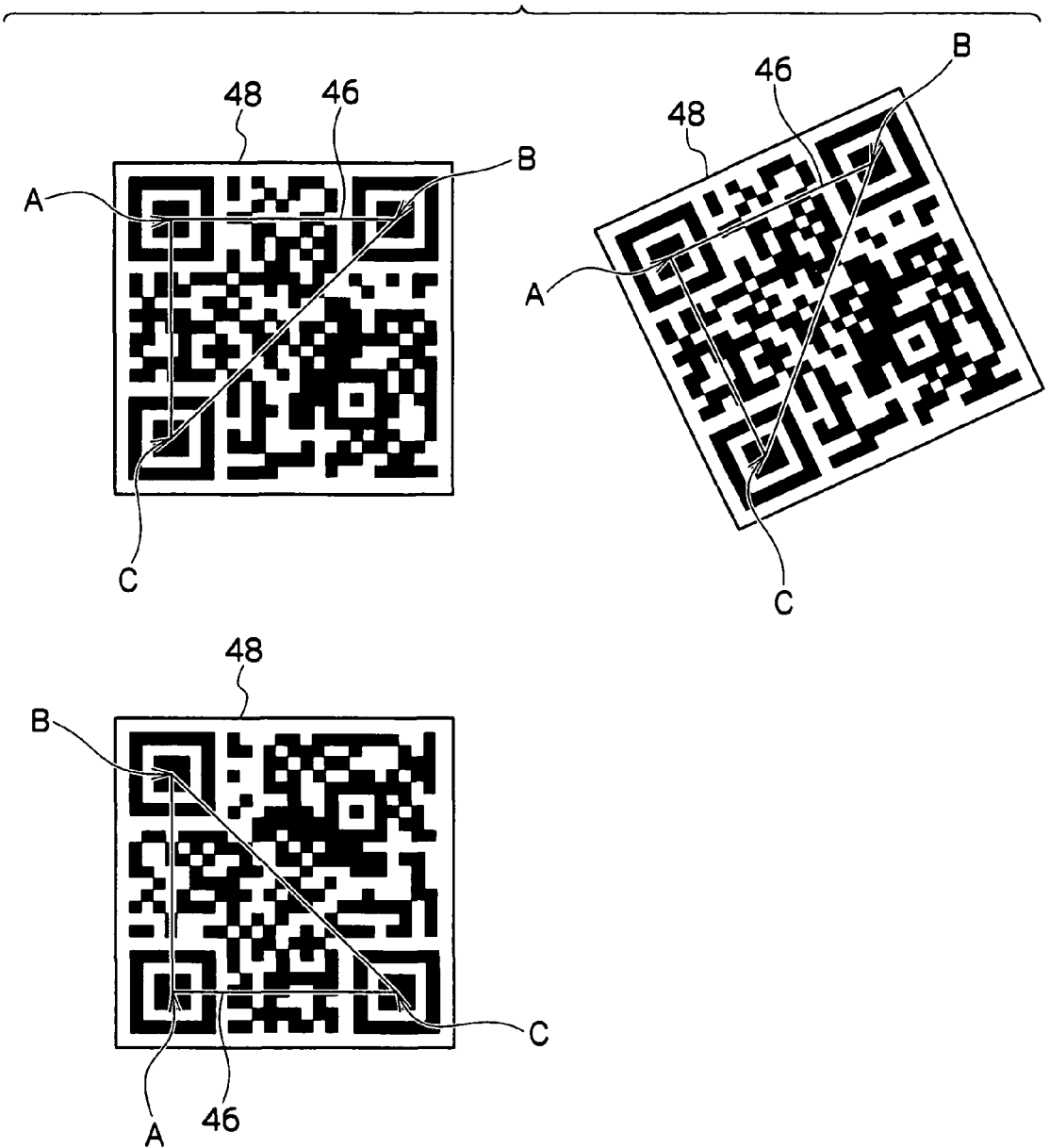
FIG. 12 is a drawing illustrating examples in which it is determined that the quiet zone exists.

FIG. 12 is a drawing illustrating examples in which it is determined that the quiet zone exists. In this case, the center points A, B, C are determined to constitute the respective apices of the right angled isosceles triangle 46, and the scan line 48 is set around the candidate region hypothesized from the coordinates of the center points A, B, C. Since the scan line 48 is composed of white pixels, it is determined that a quiet zone exists around the candidate region.

Figure 13:
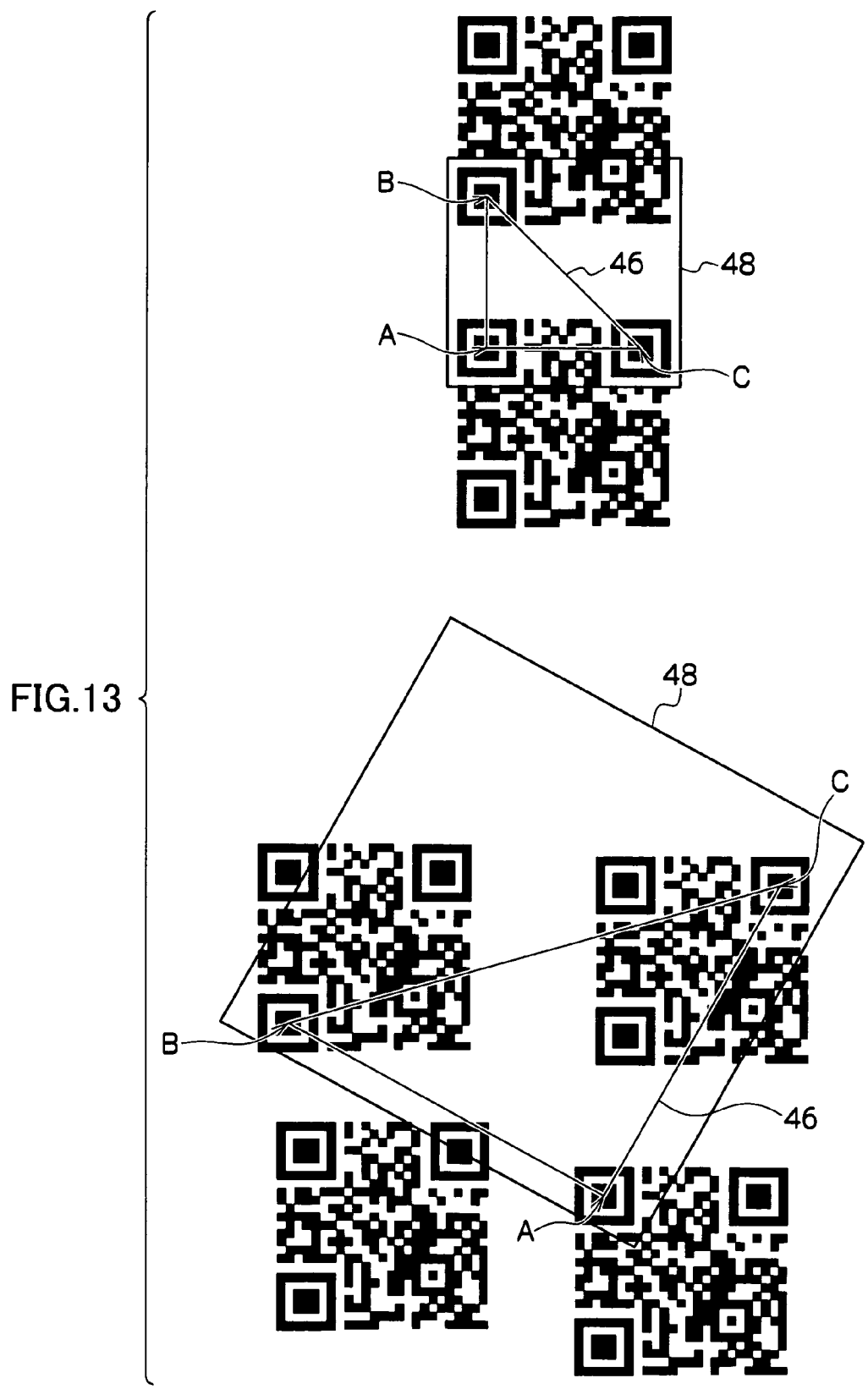
FIG. 13 is a drawing illustrating examples in which it is determined that no quiet zone exists.

On the other hand, FIG. 13 is a drawing illustrating examples in which, although the center points A, B, C are determined to constitute the respective apices of the right angled isosceles triangle 46, it is determined that no quiet zone exists. In these cases, even if all of the center points A, B, C do not belong to the same symbol, the center points A, B, C may still constitute the respective apices of the right angled isosceles triangle 46. But, if a scan line 48 is set around the candidate region hypothesized from the coordinates of the center points A, B, C, the scan line 48 is composed of white pixels and black pixels, thereby it is determined that no quiet zone exists around the candidate regions.

Figure 14:
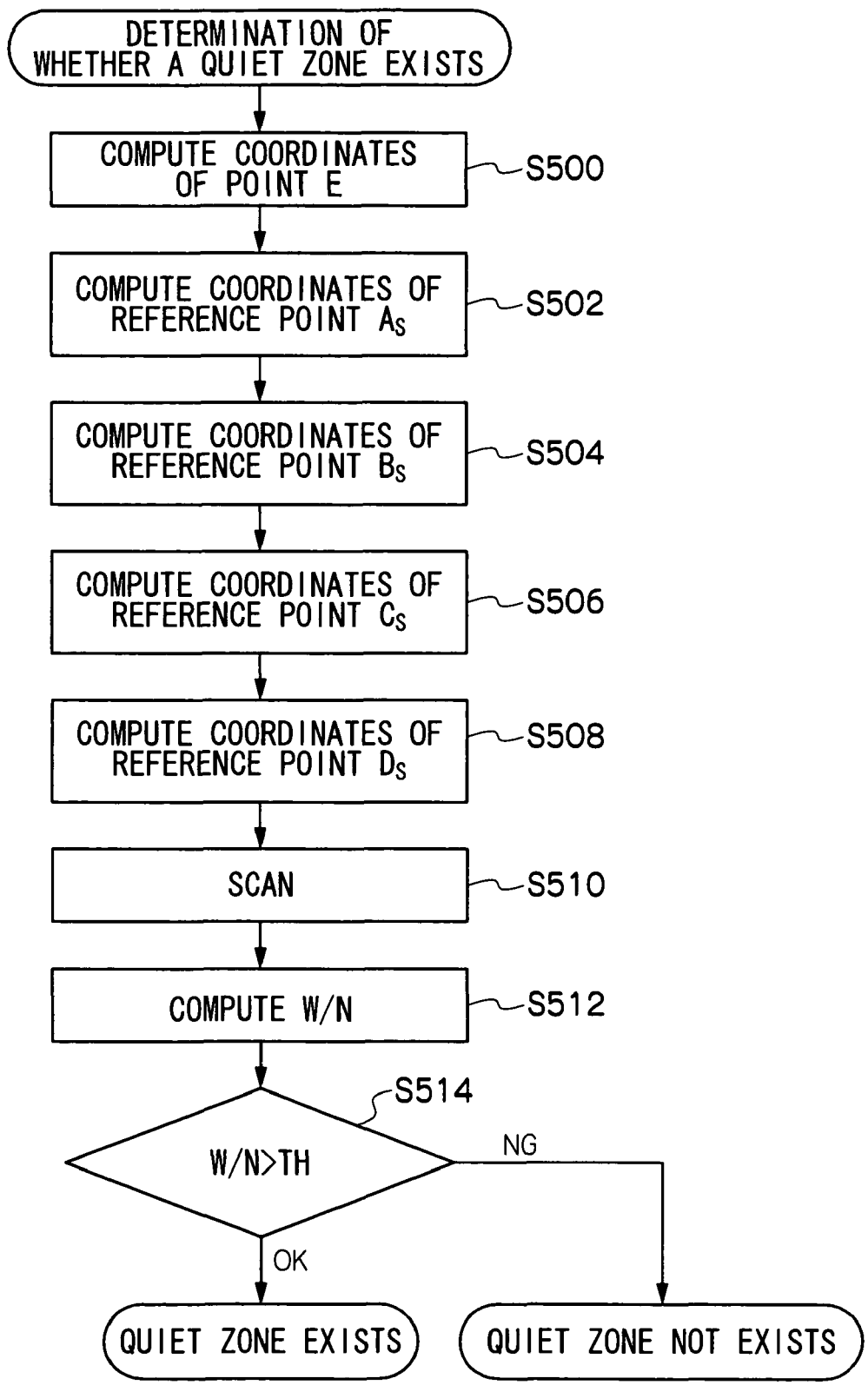
FIG. 14 is a flowchart illustrating a routine of determination process about whether or not a quiet zone exists.

FIG. 14 is a flowchart illustrating a routine for a determination process as to whether a margin region (quiet zone) exists. As described above, the key point of determining whether a quiet zone exists lies in the method of determination the location of the scan line. The coordinates of the reference points of the scan line are calculated from the coordinates of the center points A, B, C.

First, at step 500, the coordinates of the midpoint E of a segment BC connecting between the point B and the point C are computed (see FIG. 18). The point E is the midpoint of a long side of the right angled isosceles triangle in a case where the point A is given to be the right angle apex. In addition, the point E is the center point of the candidate region 40, and is also the center point of the QR code in case where the symbol exists in the candidate region 40. Given that the coordinates of the point B are $(x_b, y_b)$, and the coordinates of the point C are $(x_c, y_c)$, the coordinates $(x_e, y_e)$ of the point E are expressed by the following equation:

$$\begin{pmatrix} x_e \\ y_e \end{pmatrix} = \begin{pmatrix} \frac{x_b + x_c}{2} \\ \frac{y_b + y_c}{2} \end{pmatrix}$$

Next, at step 502 to step 506, coordinates of the reference points $A_s$, $B_s$, $C_s$ of the scan line are computed. First, the coordinates of the reference point $A_s$ are computed from the coordinates of the point A at step 502, the coordinates of the reference point $B_s$ are computed from the coordinates of the point B at step 504, and the coordinates of the reference point $C_s$ are computed from the coordinates of the point C at step 506. The detail of the computation method will be described later. Then, at step 508, the coordinates of the reference point $D_s$, which is located point-symmetrically with respect to the reference point $A_s$ about the point E, are computed. From the following vector computation, the coordinates of the point $D_s$ can be determined. Thereby, the scan line connecting the reference points $A_s$, $B_s$, $C_s$, and $D_s$ is set.

$$\vec{d}_s = \vec{b}_s + \vec{c}_s - \vec{a}_s$$

Next, at step 510, the scan line is scanned. For example, the reference point $A_s$ to the reference point $B_s$ to the reference point $D_s$ to the reference point $C_s$ to the reference point $A_s$ are scanned in this order. At the next step 512, a total number of pixels N on the scan line, a number of white pixels W, and a ratio W/N of the number of white pixels to the total number of pixels, are computed, respectively. At the subsequent step 514, a "threshold TH" set in advance in the memory of the CPU 14 is referenced, and it is determined whether the computed ratio W/N of the number of white pixels to the total number of pixels, is greater than the "threshold TH".

At step 514, when the determination is affirmative (OK), it is determined that a quiet zone exists around the candidate region (true), and the routine is terminated. On the other hand, when the determination is negative (NG), it is determined that no quiet zone exists around the candidate region (false), and the routine is terminated.

Figure 15:
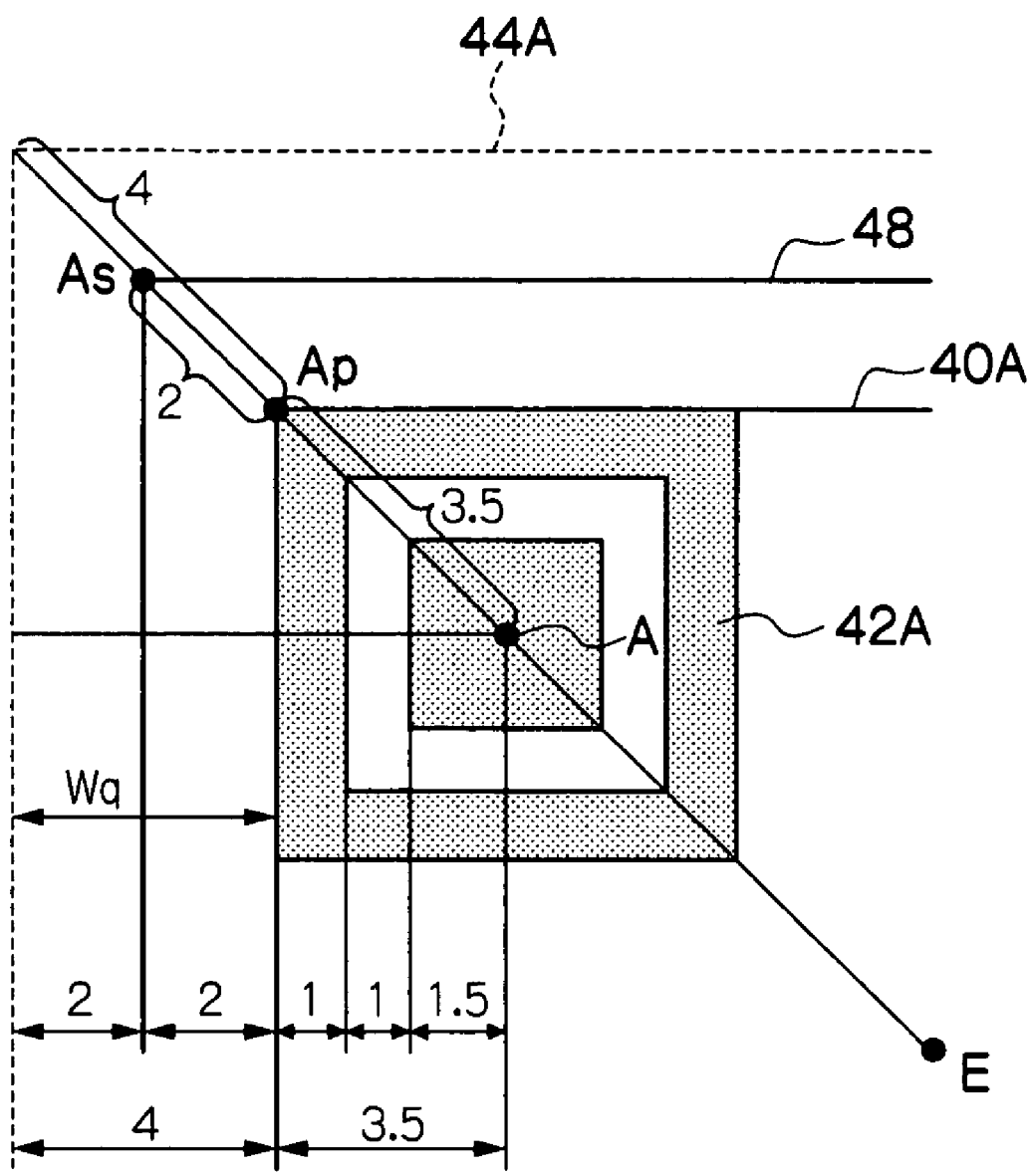
FIG. 15 is a drawing illustrating a positional relationship between a center point A of the position detection pattern and a reference point $A_s$ of a scan line.

FIG. 15 is a drawing illustrating a positional relationship between the center point A of the position detection pattern and the reference point $A_s$ of the scan line. As shown in FIG. 15, a segment EA connecting the center point E of the QR code and the center point A of the position detection pattern 42A is extended toward the outside of the QR code until the outer periphery 44A of the quiet zone. This extended line passes through the apex $A_p$ of the position detection pattern 42A, and intersects the scan line 48 at the reference point $A_s$. By examining the pixel value on the extension line, it can be seen that the pixel value is black at the center point A, but is next inverted to white, and further inverted to black. And, at the apex $A_p$ of the position detection pattern 42A, it is inverted back to white.

Figure 16:
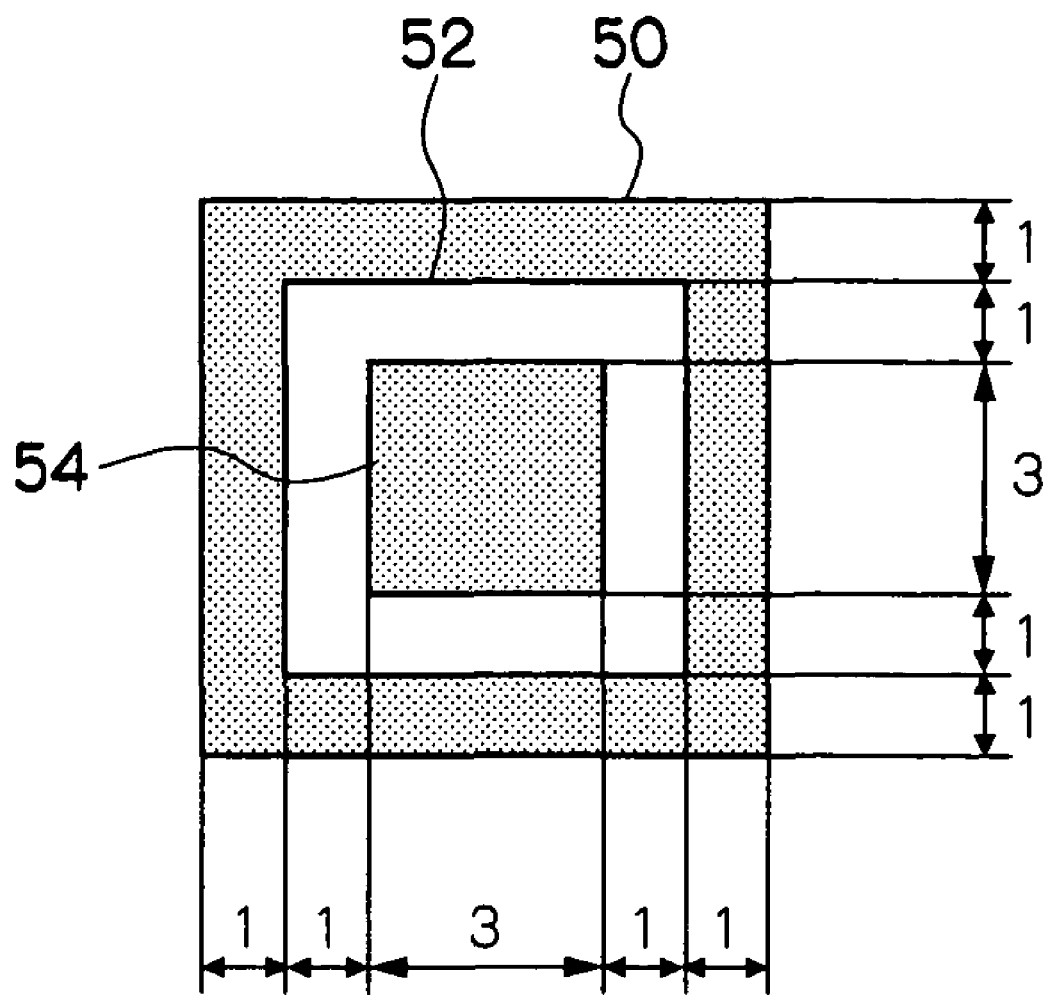
FIG. 16 is a drawing illustrating a structure of a position detection pattern.

FIG. 16 is a drawing illustrating the structure of a position detection pattern. The structure of the position detection pattern is specified by the JIS Standard, and as shown in the figure, it is formed of three concentric squares being superposed, and composed of a black 7*7 modules 50, a white 5*5 modules 52, and a black 3*3 modules 54. The ratio of the widths of the respective modules is 1:1:3:1:1.

Figure 17:
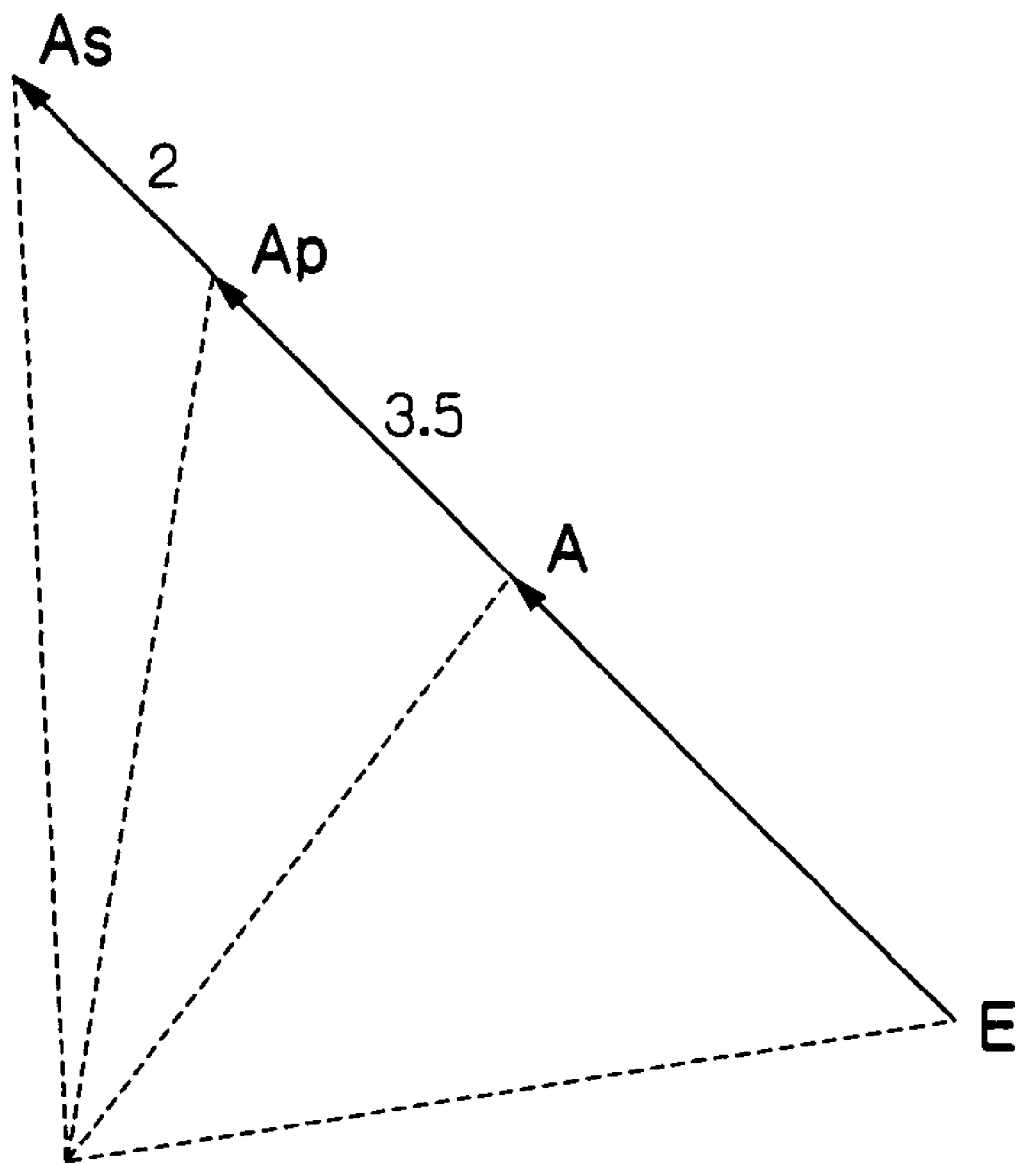
FIG. 17 is a vector diagram for finding coordinates of the reference point $A_s$.

Here, given that the module size is 1, a length of a segment $AA_p$ is expressed as 3.5 as shown in FIG. 15. The term "module size" means a minimum width of the black/white elements when the QR code is drawn. The width $W_q$ of the quiet zone is specified to be 4 module size by the JIS Standard. When the scan line 48 is set along the center line of the quiet zone, a length of a segment $A_sA_p$ is expressed as 2. In other words, the location of the reference point $A_s$ is at a location provided by extending the segment $AA_p$ having length of 3.5 by a length of 2. The vector expression is as shown in FIG. 17. Therefore, by the following vector computation, the coordinates of the reference point $A_s$ can be determined. In addition, the coordinates of the reference point $B_s$ and the reference point $C_s$ can be also determined in the same manner.

$$\vec{a}_s = \vec{a} + \frac{5.5}{3.5}(\vec{a}_p + \vec{a})$$

As described above, in the present embodiment, in a case where the condition that the center points of the three selected position detection patterns constitute respective apices of a right angled isosceles triangle, and in addition thereto, the condition that a quiet zone exist around the candidate region which is assumed from the coordinates of the three center points are satisfied, it is determined that the position detection patterns corresponding to the selected three sets of coordinates are included in the same symbol, and constitute a position finder pattern.

In the present embodiment, by adding the condition of existence of a quiet zone around the candidate region, combinations of position detection patterns (the combinations of three sets of coordinates) which are included in the same symbol are identified one after another.

In the above-described first embodiment, an example in which, for determining whether a quiet zone exists, a preset value is used as the "threshold TH" for evaluating the computed ratio W/N of the number of white pixels to the total number of pixels has been described. However, the present invention is not limited to this, and the threshold may be dynamically set according to the symbol size of the QR code read from the document image.

In the JIS Standard, as the version number of the QR code increases, the area of the QR code is also increased, and thus the scan line for determining whether a quiet zone exists is also lengthened accordingly. If the scan line is lengthened, a possibility that noise exists on the scan line will also be increased. In this case, by setting the "threshold TH" at a smaller value, existence of a quiet zone can be accurately determined even if there is a slight noise.

Figure 19:
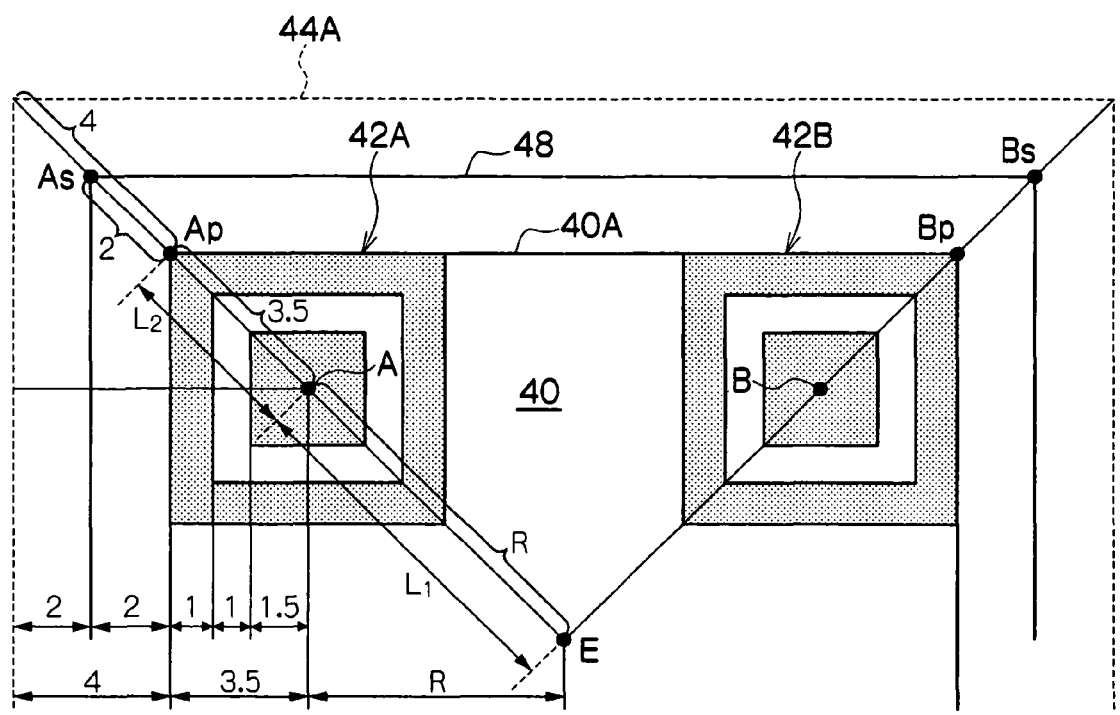
FIG. 19 is a conceptual drawing for explaining a calculation method for converted value R.

For example, the value of "threshold TH" is determined on the basis of a value R that is a result of conversion into modules of the distance from the coordinates of the center point E of the QR code to the coordinates of the center point A of the position detection pattern. FIG. 19 is a conceptual drawing for explaining a calculation method for the converted value R. A distance L1 from the coordinates of the center point E of the QR code to the coordinates of the center point A of the position detection pattern 42A, and a distance L2 from the center point A of the position detection pattern 42A to the apex $A_p$ of the position detection pattern 42A are calculated, respectively. The values of the distance L1 and the distance L2 are values converted in modules (pixels). The value of the distance L2 corresponds to 3.5 modules. Therefore, the number of modules R which correspond to the distance L1 can be determined from the following equation:

$$L1 : R = L2 : 3.5$$

$$R = \frac{3.5L1}{L2}$$

The threshold TH can be determined on the basis of the above-mentioned converted value R from the following equation. A, B are constant values. By determining the threshold TH in accordance with this equation, an optimum threshold TH can be set according to the version of the QR code.

$$TH = -AR + B$$

Figure 20:
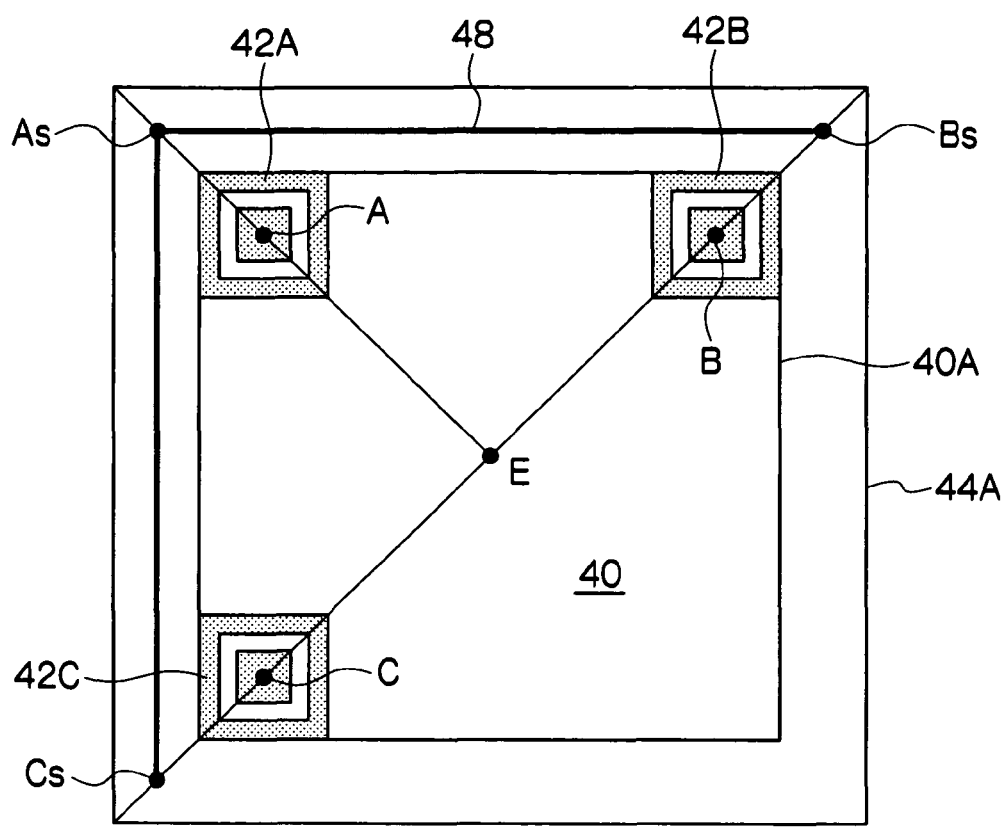
FIG. 20 is a drawing illustrating another example of scan line setting.

In the first embodiment as described above, an example in which the scan line is set around the four sides of the candidate region has been explained. However, as shown in FIG. 20, by setting the scan line 48, which connecting the reference point $C_s$, the reference point $A_s$, and the reference point $B_s$, at least a side of a short side of the right angled isosceles triangle for the candidate region 40, the existence of a quiet zone can be determined.

Figure 21:
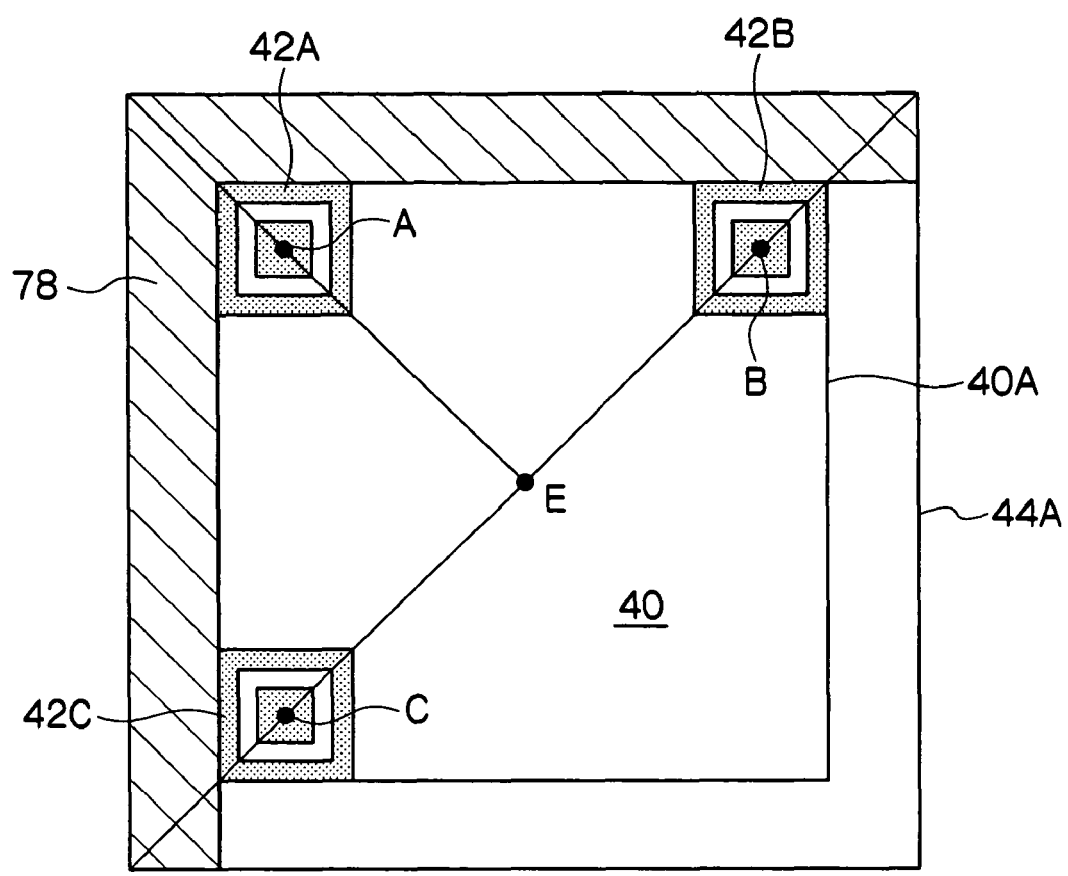
FIG. 21 is a drawing illustrating an example of scan region setting.

Further, in the first embodiment as described above, an example in which the scan line is used for determining whether a quiet zone exist has been explained. However, as shown in FIG. 21, by setting a scan region 78 (a shaded portion) of a predetermined range around the candidate region 40, and scanning the scan region 78, the existence of a quiet zone can be determined.

Further, in the first embodiment as described above, an example in which, after the determination process of right angled isosceles triangle, the determination process of whether a quiet zone exists is carried out has been explained. However, the order of processing can be switched and the determination process of whether a quiet zone exists may be followed by carrying out the determination process for right angled isosceles triangle.

Figure 22:
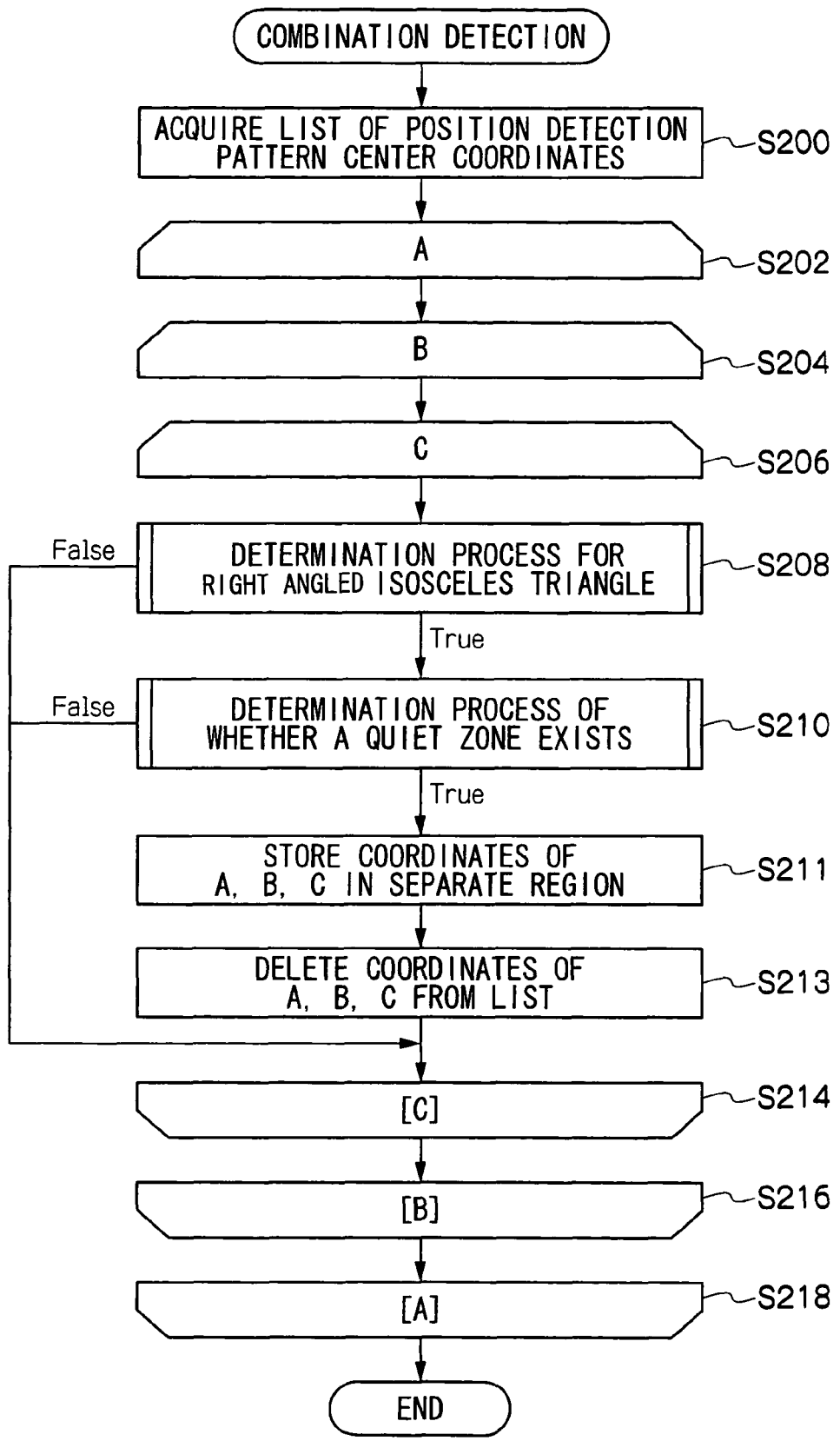
FIG. 22 is a flowchart illustrating another routine of combination detection process.

Furthermore, in the first embodiment as described above, an example in which the combination of three position detection patterns (the combination of three sets of coordinates) which are determined to constitute a position finder pattern is stored in the memory has been explained. However, as shown in FIG. 22, the routine may be modified such that, instead of storing the combination of three sets of coordinates in the memory (at step 212 in FIG. 5), the combination of three sets of coordinates is stored in a separate memory, or otherwise managed, at step 211, and at step 213, the three sets of coordinates stored in the memory are deleted from the first list. The steps other than the step 211 and 213 are the same as the processing steps as shown in FIG. 5, and thus the same steps are provided with the same references, and the explanation is omitted.

Second Embodiment

Figure 23:
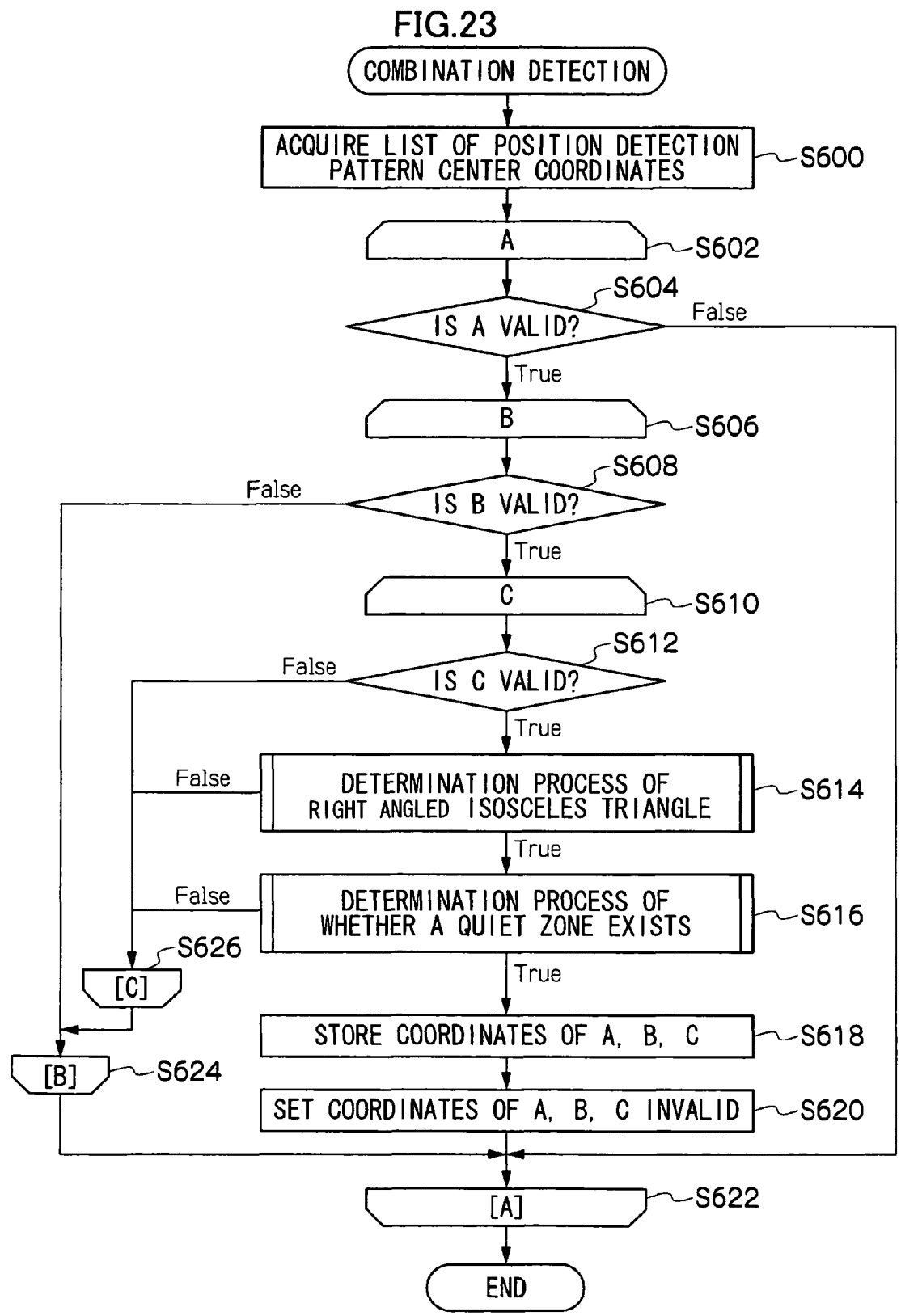
FIG. 23 is a flowchart illustrating a subroutine of combination detection process pertaining to a second embodiment of the present invention.

In the second embodiment, the coordinates of the center points are managed by a method which is different from the first embodiment, in which the coordinates of the center points of the position detection patterns are detected and listed for management. FIG. 23 is a flowchart illustrating a subroutine of combination detection process. This subroutine is performed at step 106 of the routine shown in FIG. 2. For points other than this, the processing steps are the same as those of the first embodiment.

The combination detection process as shown in FIG. 23 is performed after all of the coordinates of the center points of the position detection patterns having been detected and listed. In the symbol of one QR code, three position detection patterns are included. Therefore, in a case where N QR codes are given, the coordinates of the center points of 3N position detection patterns are listed. At the time of this listing, values of all of the coordinates are set valid.

First, at step 600, the coordinates list of the center points held in the memory 12 is referenced. Next, it is assumed that the center points of the three position detection patterns constituting a position finder pattern are A, B, C, and at step 602 to step 612, three sets of coordinates are selected and combined from the coordinates list, being associated with the center points A, B, C.

At step 602, the coordinates corresponding to the center point A are selected from the coordinates list, and at step 604, it is determined whether the selected coordinates are valid. When the determination is negative (false), in other words, in a case where the selected coordinates are invalid, the routine proceeds to step 622 for selecting valid coordinates from the coordinates list, and replacing the coordinates data corresponding to the center point A therewith. When the determination is affirmative (true), in other words, in a case where the selected coordinates are valid, the routine proceeds to the next step 606.

Next, at step 606, the coordinates corresponding to the center point B are selected from the coordinates list, and at step 608, it is determined whether the selected coordinates are valid. When the determination is negative (false), in other words, in a case where the selected coordinates are invalid, the routine proceeds to step 624 for selecting valid coordinates from the coordinates list, and replacing the coordinates data corresponding to the center point B therewith. When the determination is affirmative (true), in other words, in a case where the selected coordinates are valid, the routine proceeds to the next step 610.

Next, at step 610, the coordinates corresponding to the center point C are selected from the coordinates list, and at step 612, it is determined whether the selected coordinates are valid. When the determination is negative (false), in other words, when the selected coordinates are invalid, the routine proceeds to step 626 for selecting valid coordinates from the coordinates list, and replacing the coordinates data corresponding to the center point C therewith. When the determination is affirmative (true), in other words, when the selected coordinates are valid, the routine proceeds to the next step 614.

Next, at step 614, the determination process for right angled isosceles triangle is performed. The determination process for right angled isosceles triangle is performed in accordance with the routine as shown in FIG. 7. Here, when the determination is affirmative (true), there is a possibility that the center points A, B, C constitute respective apices of a right angled isosceles triangle, and the three position detection patterns are included in the same symbol. Therefore, the routine proceeds to the next step 616 for performing the determination process of whether a quiet zone exists. The determination process of whether a quiet zone exists is performed in accordance with the routine as shown in FIG. 14.

At step 616, when the determination is affirmative (true), the selected three sets of coordinates are listed as a group of coordinates representing a position of a position finder pattern, and stored in the memory 12 at step 618. In other words, it is determined that the position detection patterns corresponding to the selected three sets of coordinates are included in the same symbol, and constitute a position finder pattern, and the combination of the pertinent coordinates is stored in the memory 12.

Next, at step 620, the values of the coordinates stored in the coordinates list are set invalid. The position detection patterns corresponding to the selected three sets of coordinates are already been determined to constitute a position finder pattern. Therefore, it is impossible that they constitute the coordinates of the center points of a position finder pattern of another QR code. Therefore, the values of the selected three sets of coordinates can be set invalid.

Next, at step 622, it is verified whether all of the combinations have been selected, and when all of the combinations have been selected, the routine is terminated. On the other hand, here, if there is a combination which has not been selected, the routine returns to step 602, and a different combination of three sets of coordinates is selected from the coordinates list, being associated with the center points A, B, C, and the processes of step 602 to step 620 are repeated.

As described above, in the present embodiment, in case where the condition that the center points of the three selected position detection patterns constitute respective apices of a right angled isosceles triangle, and in addition thereto, the condition that a quiet zone exist around the candidate region which is assumed from the coordinates of the three center points are satisfied, it is determined that the position detection patterns corresponding to the selected three sets of coordinates are included in the same symbol, and constitute a position finder pattern.

Further, the values of the coordinates of the center points which have been determined as to constitute a position finder pattern are set invalid, and are not used for the subsequent determination.

Since the process of the first embodiment is simple, it is suited for implementation in hardware (HW), or implementation in firmware such as a DSP. Contrarily to this, since the process of the second embodiment is complicated, but the amount of processing is reduced, it is suited for implementation in software (SW).

Third Embodiment

Figure 24:
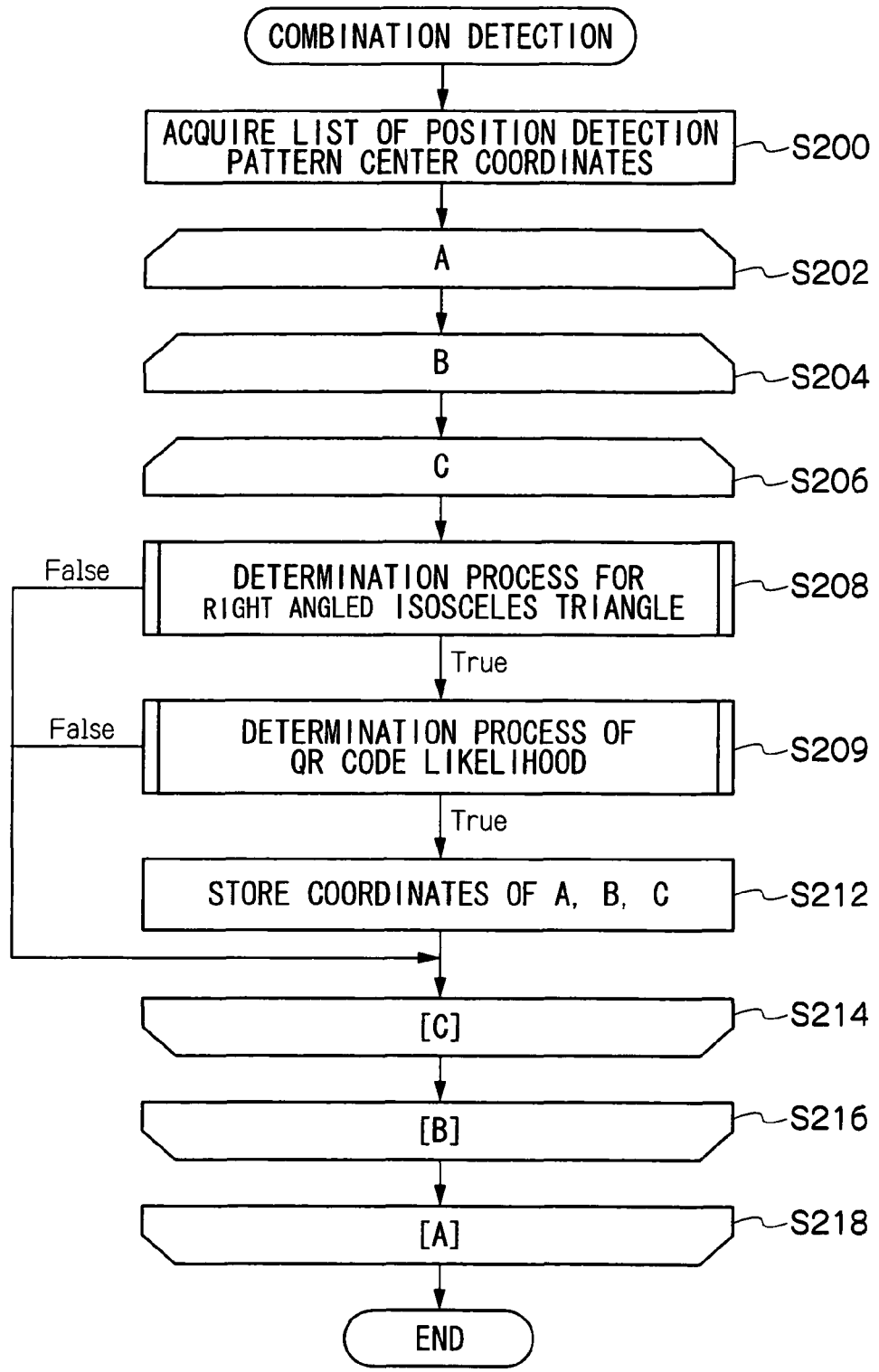
FIG. 24 is a flowchart illustrating a subroutine of combination detection process pertaining to a third embodiment of the present invention.

In the third embodiment, by utilizing a feature that, in the region where the symbol of a QR code exists, a ratio of black pixels to white pixels is substantially equal (this feature is hereinafter called as "QR code likelihood"), a combination of position detection patterns is detected. FIG. 24 is a flowchart illustrating a subroutine for combination detection process. This subroutine is performed at step 106 of the routine as shown in FIG. 2. For points other than this, the processing steps are the same as those of the first embodiment.

With this subroutine, as shown in FIG. 24, instead of the determination process of whether a quiet zone exists (step 210 in FIG. 5), the QR code likelihood is determined at step 209. The steps other than step 209 are the same as the processing steps shown in FIG. 5, thus the same steps are provided with the same references, and the explanation is omitted.

Figure 25:
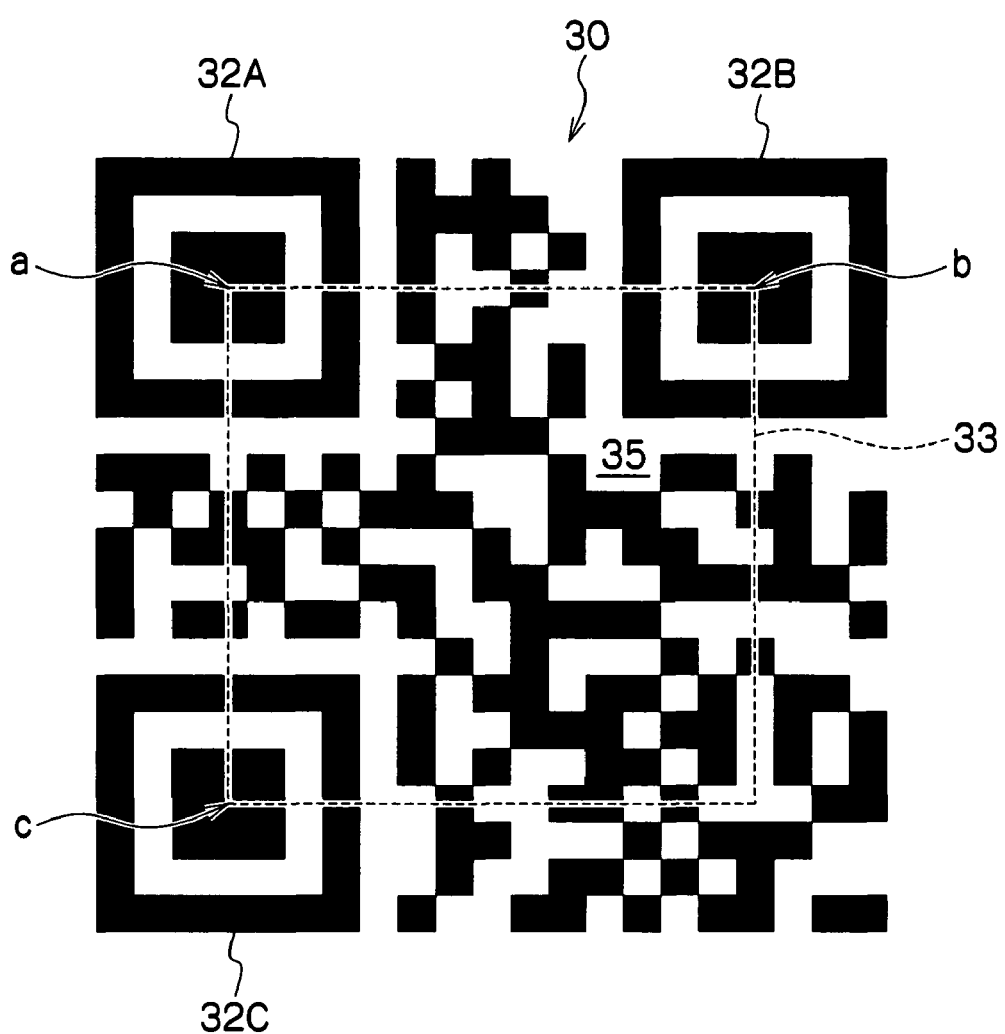
FIG. 25 is a drawing for explaining the determination method for QR code likelihood.
Figure 26:
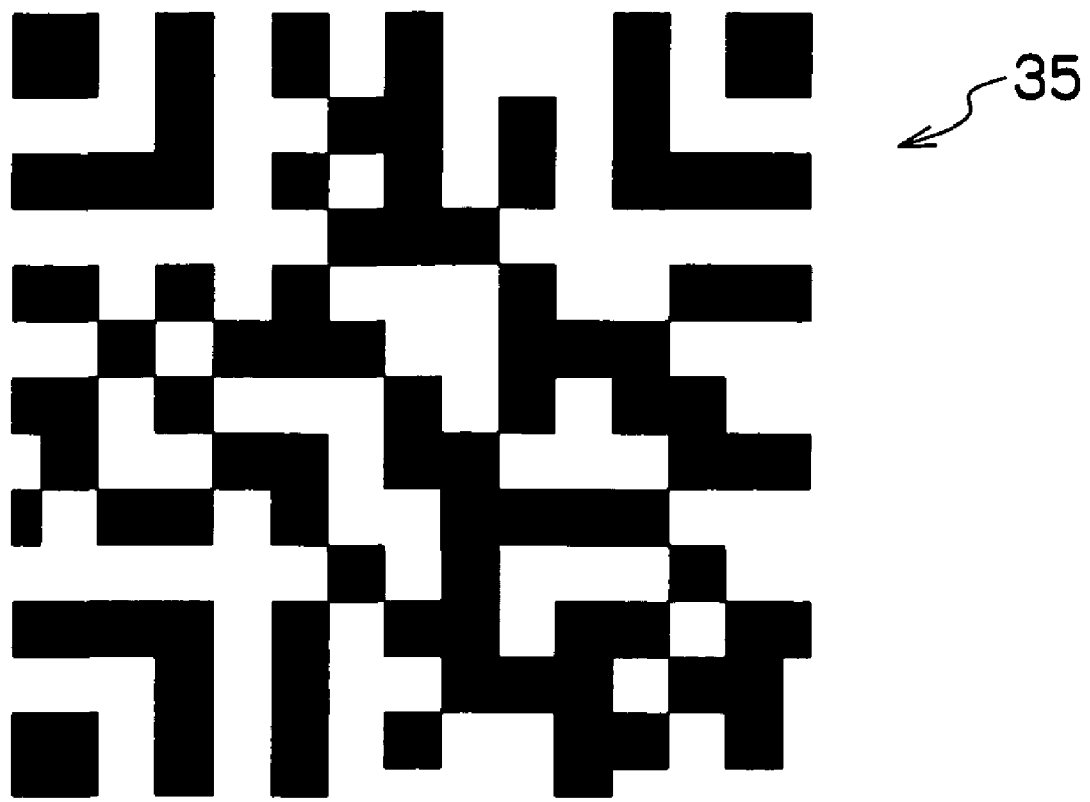
FIG. 26 is a drawing for explaining the determination method for QR code likelihood.

Here, the "determination process of QR code likelihood" which is performed at step 209 in FIG. 24 will be described in detail. FIG. 25 and FIG. 26 are drawings for explaining the determination method of the QR code likelihood.

As shown in FIG. 25, in a case where the symbol 30 of a QR code exists, assuming that the center points of the three position detection patterns 32A, 32B, 32C are a, b, c, the region 35 surrounded by a square 33 in which respective apices are the points a, b, c exists inside of the symbol 30. FIG. 26 is a drawing which clipping out this region 35. As can be seen from FIG. 25 and FIG. 26, in the region 35 surrounded by the square 33, a number of white pixels is substantially equal to a number of black pixels. In other words, a ratio of the number of white pixels to the number of black pixels is substantially 1, and the difference between the number of white pixels and the number of black pixels is substantially 0. In addition, a number of white-black inversion times is relatively high.

Figure 27:
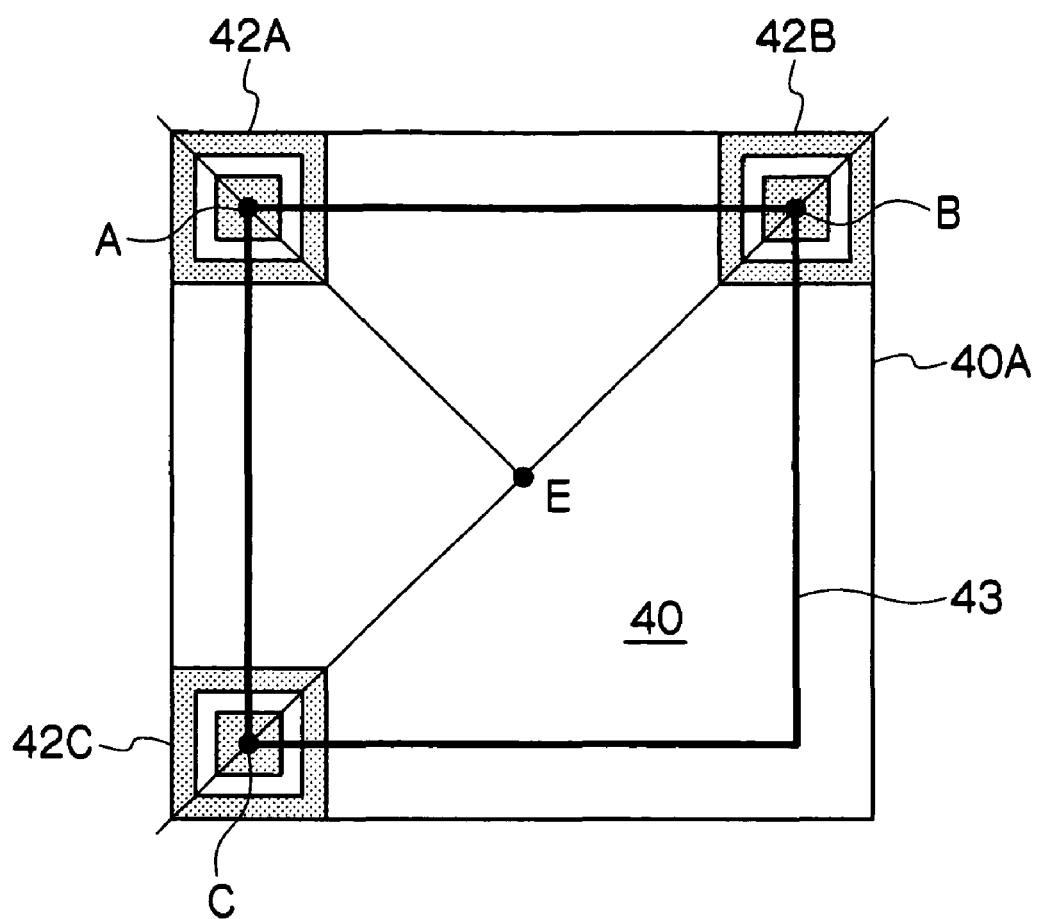
FIG. 27 is a drawing illustrating a determination region of QR code likelihood.

In the present embodiment, as shown in FIG. 27, it is assumed that the center points of the three position detection patterns 42A, 42B, 42C are A, B, C, and a region 40 (a candidate region) surrounded by a square 43 in which respective apices are the points A, B, C is assumed. This candidate region 40 is scanned, and when, as a result of calculating the number of white pixels and the number of black pixels, the ratio of the number of white pixels to the number of black pixels is within a preset range, it can be determined that the candidate region 40 has a QR code likelihood. In other words, since the region where the symbol exists provides a feature of the QR code that the proportion of white pixels and black pixels is substantially equal, the possibility that the candidate region 40 exists within the symbol is extremely high.

Specifically, as shown in the following expression, when the difference between the number of white pixels and the number of black pixels is smaller than the "threshold M", it is determined that there is a QR code likelihood. In the expression, the "threshold M" is a constant value representing a margin, and is set according to the symbol size of the QR code.

|(number of white pixels)−(number of black pixels)|<M (M: Constant)

Figure 28:
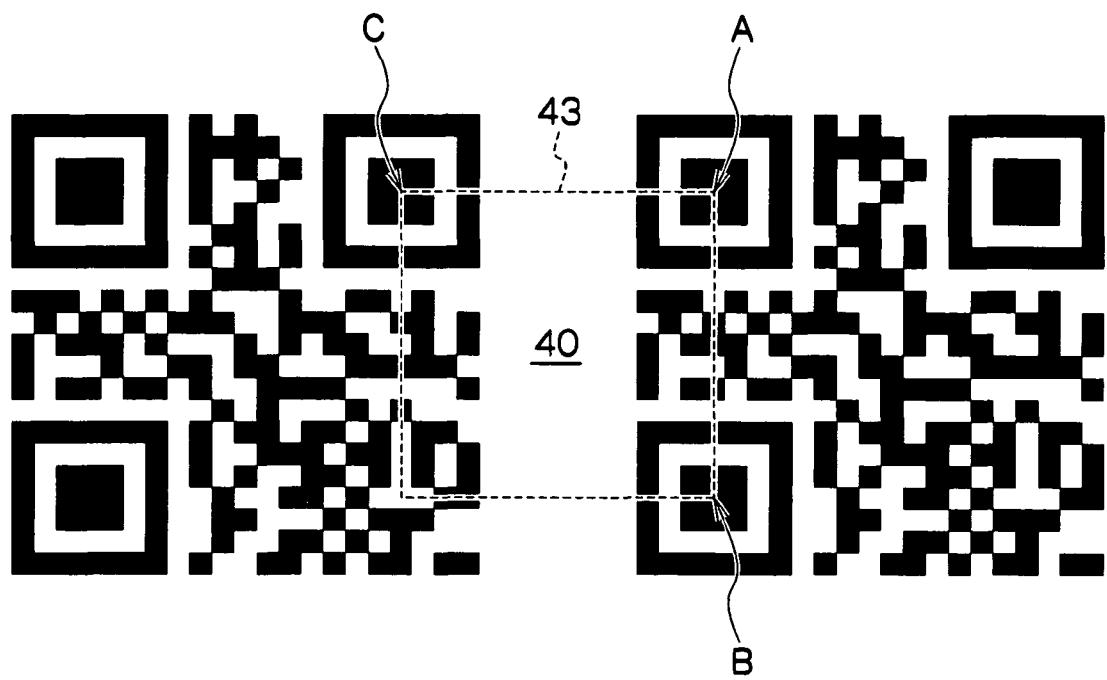
FIG. 28 is a drawing illustrating an example in which it is determined that there is no QR code likelihood.

On the other hand, FIG. 28 is a drawing illustrating an example in which, although it has been determined that the center points A, B, C constitute respective apices of a right angled isosceles triangle, it is determined that there is no QR code likelihood. Thus, even if all of the center points A, B, C do not belong to the same symbol, the center points A, B, C may constitute respective apices of a right angled isosceles triangle. In this case, in the candidate region 40 assumed from the coordinates of the center points A, B, C, a proportion of the number of white pixels with respect to the black pixels is overwhelmingly high, thereby it is determined that there is no QR code likelihood.

Figure 29:
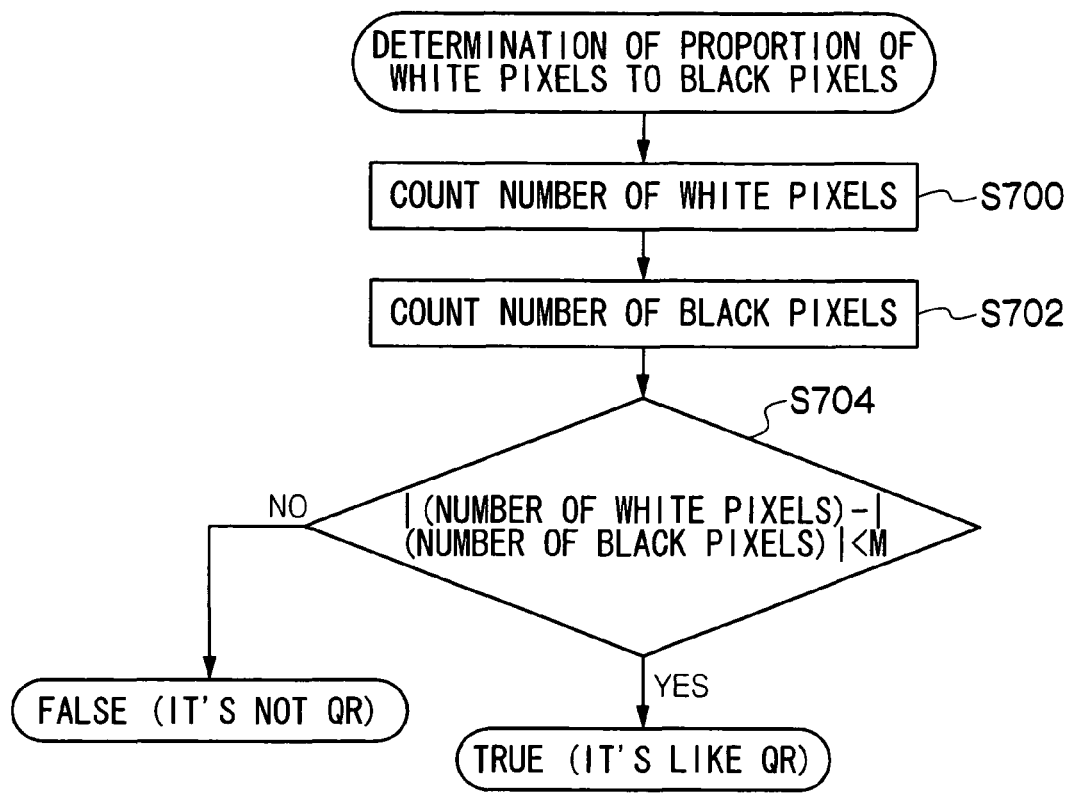
FIG. 29 is a flowchart illustrating a routine of determination process for a QR code likelihood.

FIG. 29 is a flowchart illustrating a routine for determination process of QR code likelihood. This routine is performed at step 209 in FIG. 24. First, at step 700, the number of white pixels in the candidate region 40 is counted. At the next step 702, the number of black pixels in the candidate region 40 is counted. At the subsequent step 704, the difference between the number of white pixels and the number of black pixels is determined, and it is determined whether the difference is smaller than the "threshold M". When the determination is affirmative (YES), it is determined that the candidate region 40 has a QR code likelihood (true), and the routine is terminated. On the other hand, when the determination is negative (NO), it is determined that the candidate region 40 has no QR code likelihood (false), and the routine is terminated.

As described above, in the present embodiment, in a case where the condition that the center points of the three position detection patterns selected constitute respective apices of a right angled isosceles triangle, and in addition thereto, the condition that the determination region which is assumed from the coordinates of the three center points has a QR code likelihood are satisfied, it is determined that the position detection patterns corresponding to the selected three sets of coordinates are included in the same symbol, and constitute a position finder pattern.

Figure 9:
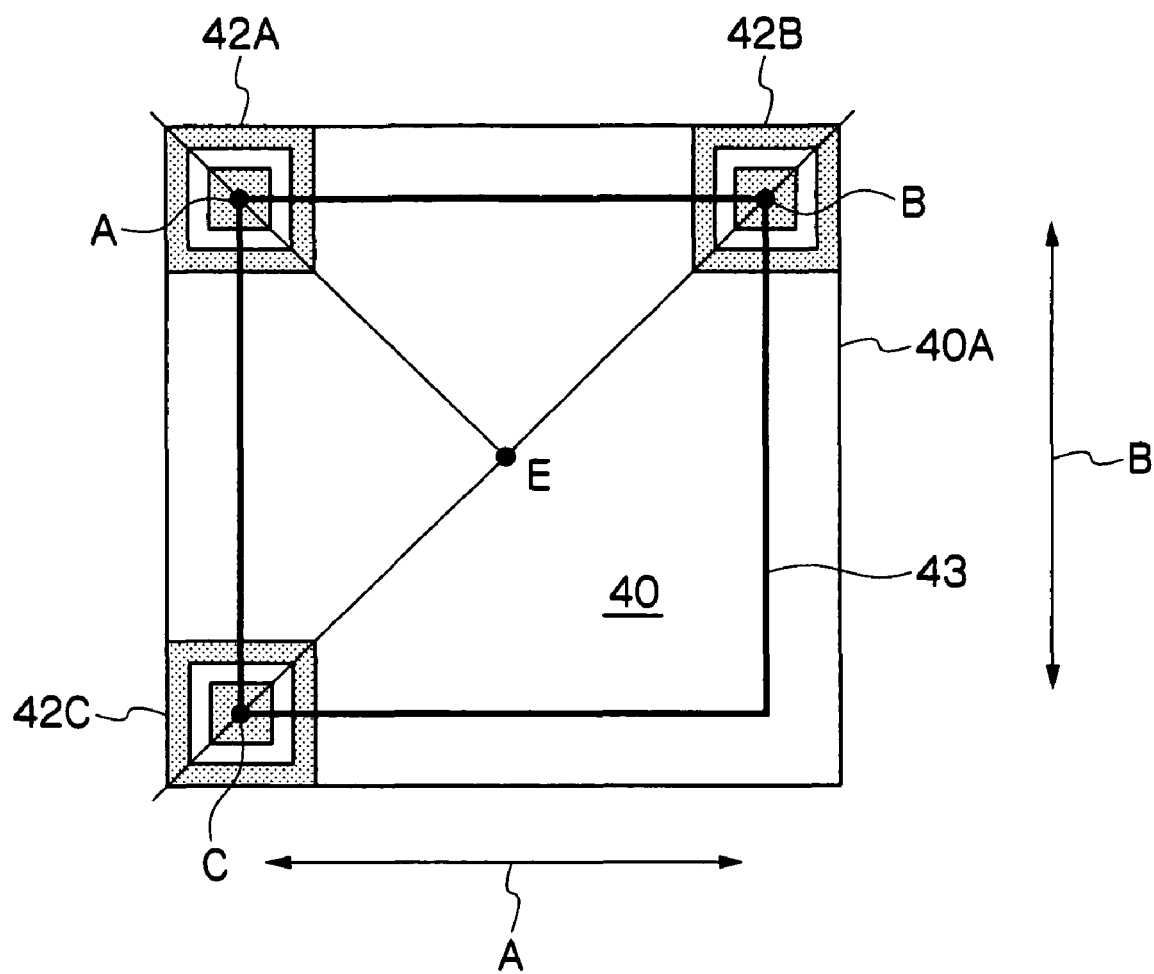
FIG. 9 is a drawing for explaining a determination method for QR code likelihood.

In the third embodiment as described above, an example in which the "proportion of white pixels to black pixels" is used as a numerical index representing the QR code likelihood has been explained. However, as shown in FIG. 9, the "number of white-black inversion times" when the candidate region 40 is scanned in the horizontal direction (indicated with an arrow A) or in the vertical direction (indicated with an arrow B) may be used as the numerical index representing the QR code likelihood. In addition, both of the "proportion of white pixels to black pixels" and the "number of white-black inversion times" may be used as the index.

Figure 30:
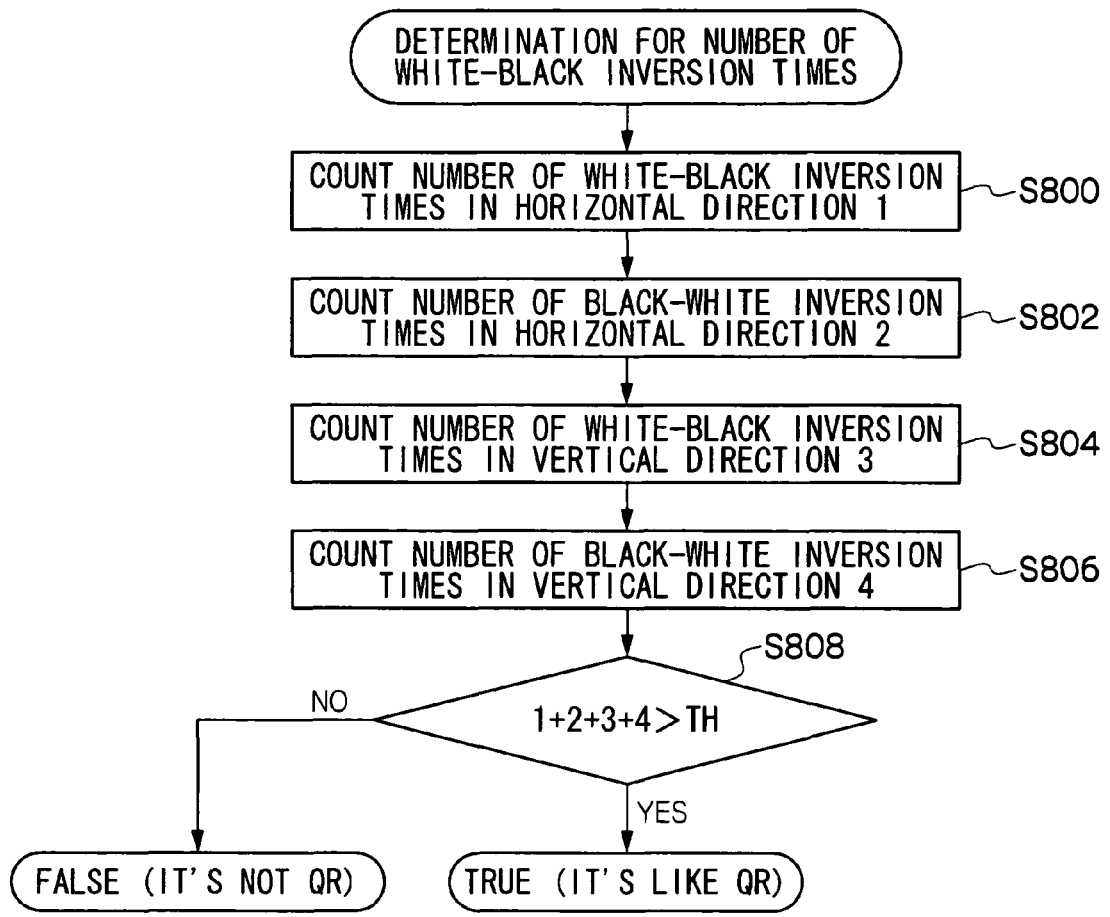
FIG. 30 is a flowchart illustrating another routine of determination process for a QR code likelihood.

FIG. 30 is a flowchart illustrating another routine for determination process of QR code likelihood. This routine is performed at step 209 in FIG. 24. First, at step 800, the number of white-black inversion times (the number of times of the pixel value being changed from white to black) when the candidate region 40 is scanned in the horizontal direction is counted. At the next step 802, the number of black-white inversion times (the number of times of the pixel value being changed from black to white) when the candidate region 40 is scanned in the horizontal direction is counted. Further, at step 804, the number of white-black inversion times when the candidate region 40 is scanned in the vertical direction is counted. At the next step 806, the number of black-white inversion times when the candidate region 40 is scanned in the vertical direction is counted.

Figure 31:
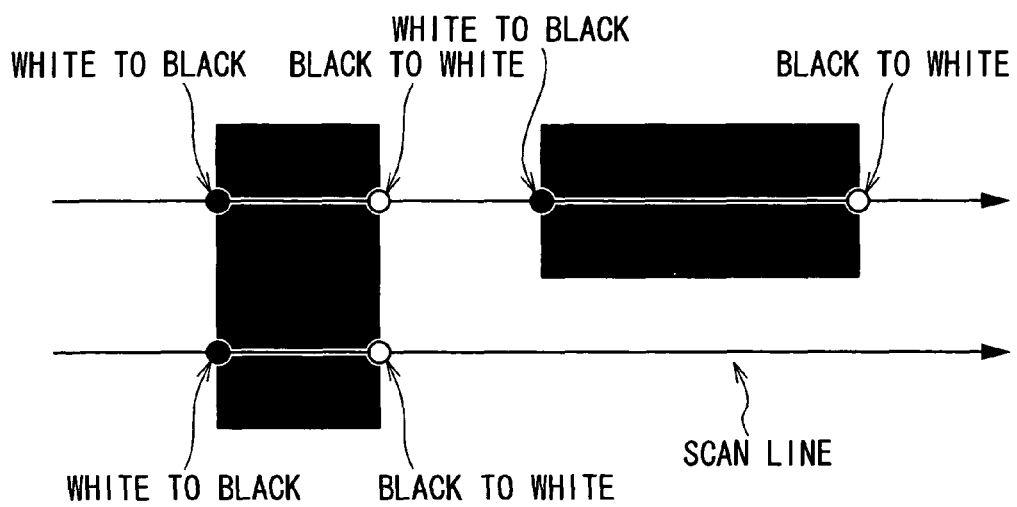
FIG. 31 is a drawing illustrating an example of counting a number of white-black inversion times.

FIG. 31 is a drawing illustrating an example of counting the number of white-black inversion times when scanning is performed in the horizontal direction. In this example, the number of white-black inversion times is 3, and the number of black-white inversion times is 3.

Next, at step 808, the total value (sum) of the four numbers of inversion times determined at step 800 to step 806 is calculated, and it is determined whether the sum is greater than the "threshold TH". When the determination is affirmative (YES), it is determined that the candidate region 40 has a QR code likelihood (true), and the routine is terminated. On the other hand, when the determination is negative (NO), it is determined that the candidate region 40 has no QR code likelihood (false), and the routine is terminated.

In addition, in the third embodiment as described above, an example in which, after the determination process of right angled isosceles triangle, the determination process about of QR code likelihood is carried out has been explained. However, the order of processing can be switched and the determination process of QR code likelihood may be followed by carrying out the determination process of right angled isosceles triangle.

In addition, in the third embodiment as described above, an example in which the determination process of QR code likelihood is carried out in the "combination detection process" has been explained. However, the determination process of whether a quiet zone exists may be carried out together with the determination process of QR code likelihood.

Fourth Embodiment

Figure 32:
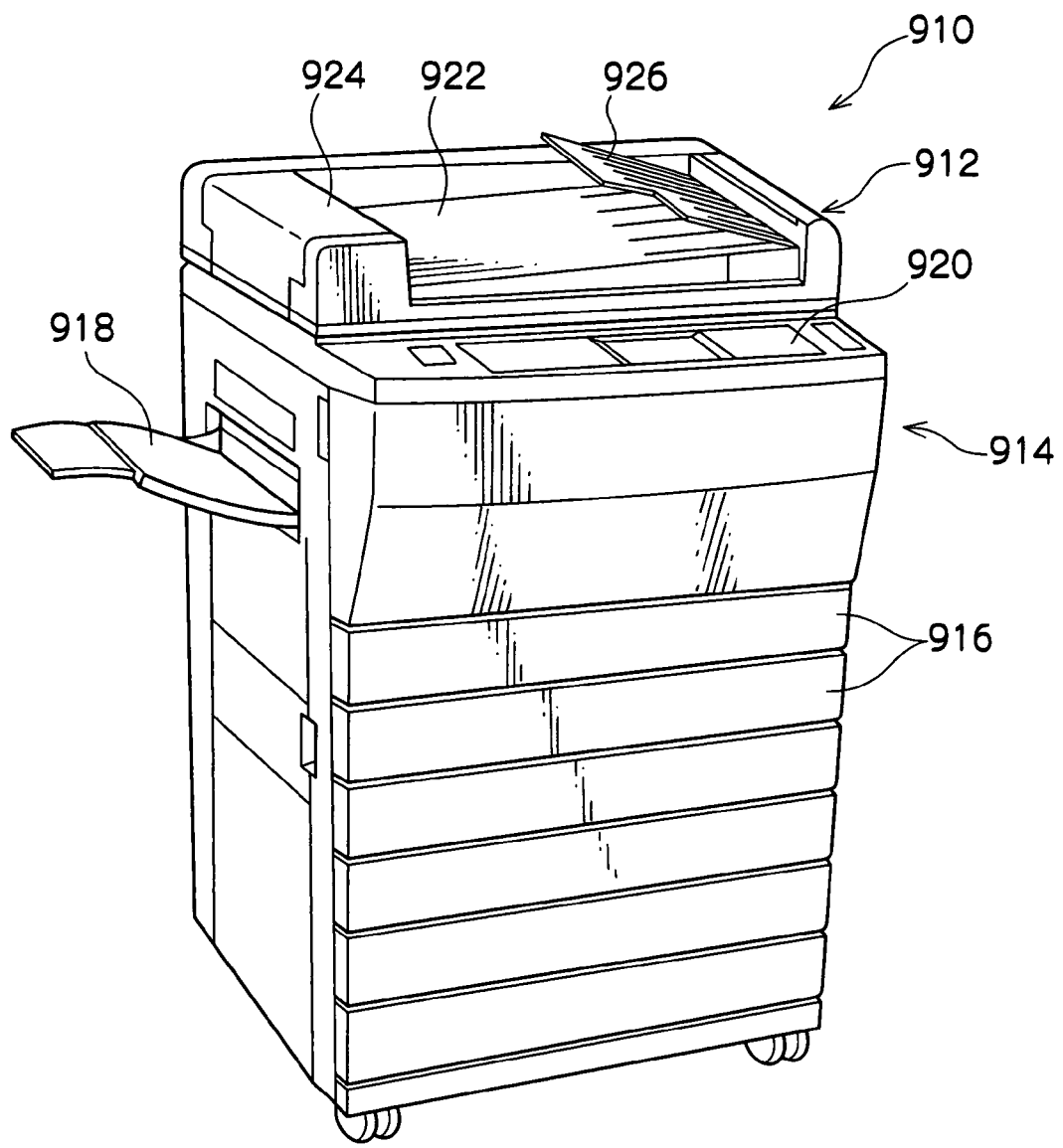
FIG. 32 is an appearance view of a multi-function machine pertaining to fourth to sixth embodiments.

FIG. 32 is an appearance view of a multi-function machine 910 pertaining to the present embodiment.

As shown in the same drawing, the multi-function machine 910 includes a document reading section 912, an image formation section 914, a paper containing section 916, a tray 918 and an operation section 920.

The document reading section 912 is configured to include a document tray 922, an automatic document feeding device 924, and a document discharging tray 926. The automatic document feeding device 924 separates the documents loaded on the document tray 922 for feeding them to the reading position, and thereafter delivers the document to the document discharging tray 926.

In the above-mentioned reading position, a reading mechanism which is configured to include a light source, a CCD, and the like, is provided. In the reading mechanism, reflected light from the document fed to the reading position is appropriately imaged by a lens, and the like, and read with the CCD.

The multi-function machine 910 is capable of performing: acquisition of image data representing a document image by the document reading section 912; data transmission and reception by communication with an external device by a communication section (not shown); image formation on the basis of the image data by the image formation section 914, and the like. In addition, it is capable of comprehensively performing various processes, such as scanning, copying, printing, facsimile sending/receiving, and the like, and is operated on the basis of instructions inputted through the operation section 920, or instructions inputted from an external device via communication.

At the time of image forming by the image formation section 914, the papers contained in the paper containing section 916 are fed one by one to the image formation section 914, an image is formed on the paper, based on the image data of the document image read by the document reading section 912, the image data inputted via communication with the external, or the like, and the paper on which the image is formed is discharged to the tray 918.

FIG. 33 is a block diagram schematically illustrating the electrical configuration of the multi-function machine 910. As shown in the diagram, the multi-function machine 910 is configured to include a CPU 930 for controlling overall operation of the device. The operation section 920, a reading control section 932 which controls the reading mechanism for acquiring digital image data, a communication control section 934 which controls communication with the external, an image formation control section 936 which controls the image formation section 914, and a memory 938 are connected to the CPU 930.

The CPU 930 controls the reading control section 932, the communication control section 934, and the image formation control section 936 on the basis of the instruction inputted through the operation section 920.

In the present embodiment, when digital image data obtained by the reading control section 932 through the reading mechanism includes an image representing a two-dimensional code, the two-dimensional code is detected to be decoded.

Figure 34A:
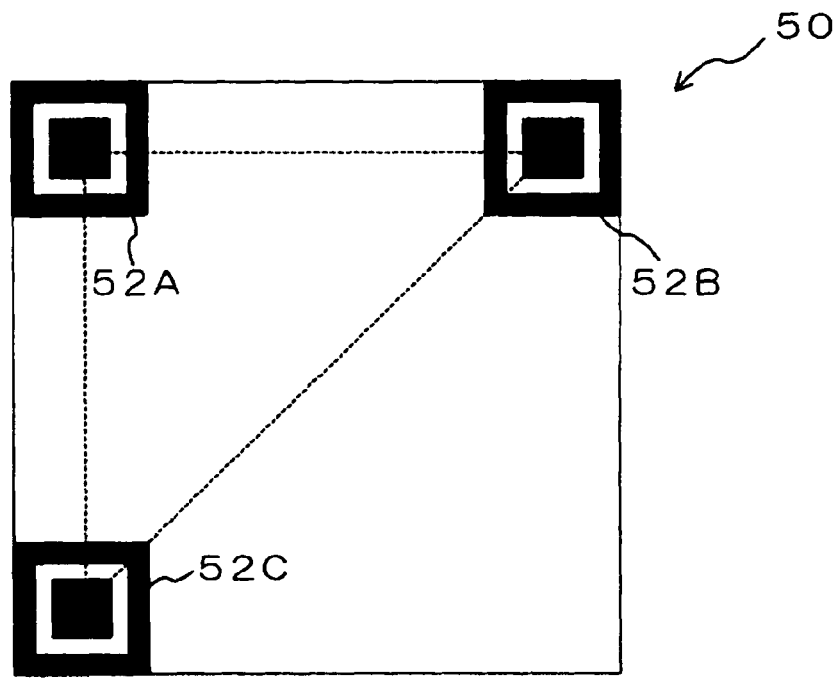
FIG. 34A and FIG. 34B are explanatory drawings illustrating a configuration of a QR code in a simplified form as one example of the two-dimensional code.
Figure 34B:
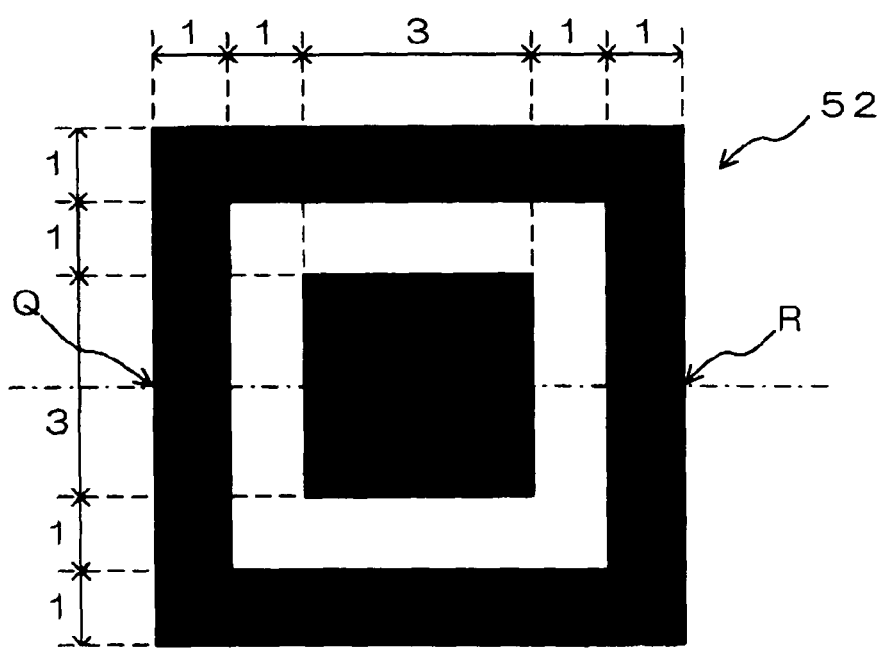

FIG. 34A and FIG. 34B are explanatory drawings illustrating the configuration of a QR code in a simplified form as one example of the two-dimensional code. The same components as those in FIG. 16 are provided with the same references, and the explanation is omitted. As shown in FIG. 34A, the QR code 50 is formed in a square region, and at three of the four corners of the region, position detection patterns 52 are disposed. In the drawing, the region other than the position detection patterns 52 of the QR code 50 that is indicated with a white solid fill is divided into plural cells. The respective cells are regions where patterns based on coded information are disposed, and actually, for example, plural cells which are black or white solid fills, and are smaller than the position detection pattern 52 are appropriately arranged.

As shown in FIG. 34A, the three position detection patterns 52A, 52B, and 52C constituting one QR code 50 are used to identify the top and bottom of the QR code, and are decoded such that the corner at which no position detection pattern 52 is disposed located at lower right.

As shown in FIG. 34B, the position detection pattern 52 is a doubled square, and contrast pattern of a straight line passing through the center thereof (for example, a line as shown with a dot-dash line in the same drawing) is dark-light-dark-light-dark at a ratio of 1:1:3:1:1. The ratio is stored in a predetermined region of the memory 938 in advance, and in actual detection, margin of ±0.5 is allowed.

The CPU 938 stores, on the basis of the image data, when a pixel line passing through the contrast pattern of the position detection pattern 52 is detected within the image, positions of a first point Q and a last point R, which are on the outer edge of the position detection pattern 52. The point Q and the point R are sequentially stored for the pixel lines adjacent to the pertinent pixel line, until all lines which cross the inner dark square are recognized, for deriving the center position of the position detection pattern 52. The coordinates of the derived center position of the position detection pattern 52 within the image are stored in the memory 938 as the center coordinates.

By using such a procedure, for all of the pixel lines within the image, detection of the position detection pattern 52 and storage of the center coordinates are carried out, and using the center coordinates stored, the number of QR codes 50 and the positions thereof are identified. Three sets of center coordinates are given per QR code 50, thus assuming that the number of QR codes 50 included in the image is N, 3N sets of center coordinates are detected.

When the position of the QR code 50 is identified, the QR code 50 is decoded on the basis of the image representing the QR code 50.

Here, operations of the present embodiment will be described.

Figure 36:
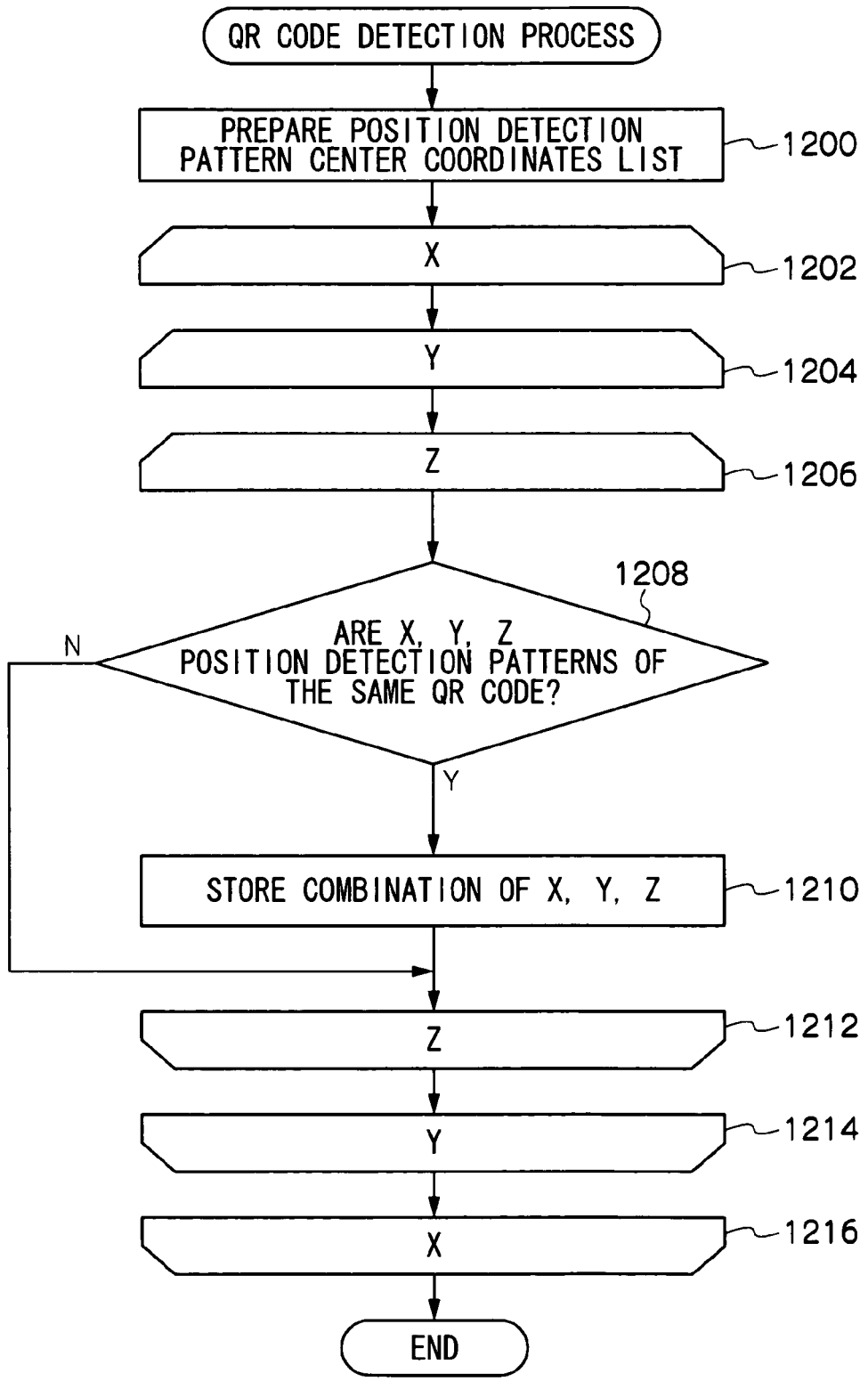
FIG. 36 is a flowchart illustrating a flow of processing of a QR code detection process program.

FIG. 36 is a flowchart illustrating a flow of processing of a QR code detection process program executed by the CPU 930. Here, with reference to the same drawing, the QR code detection process of the present embodiment will be described.

First, at step 1200, the position detection pattern center coordinates list is prepared. At the next step 1202, the No. 1 center coordinates of the position detection pattern center coordinates list are set as X. At the next step 1204, the No. 1 center coordinates of the position detection pattern center coordinates list are set as Y Thereafter, the routine proceeds to step 1206 for setting the No. 1 center coordinates of the position detection pattern center coordinates list as Z.

Figure 35:
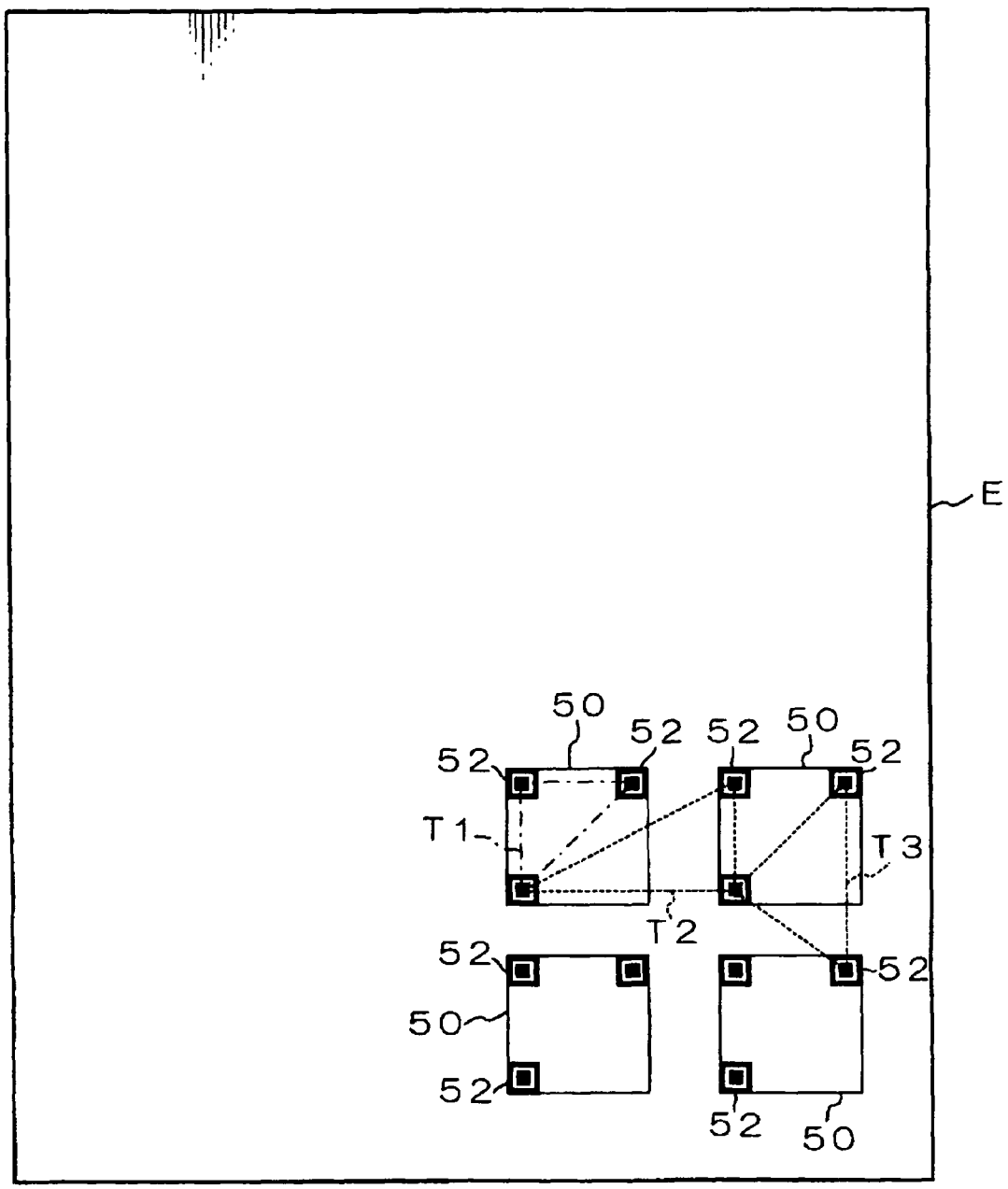
FIG. 35 is a schema illustrating a state in which four QR codes are included in a read image region.

As shown in FIG. 35, when four QR codes 50 are included in the read image region E, the center coordinates of at least 12 position detection patterns are listed up. In order to decode the QR codes 50, it is necessary that the position and the region of the respective QR codes 50 be identified on the basis of these center coordinates.

Then, the routine proceeds to step 1208 for determining whether the X, Y, Z are the position detection patterns 52 of the same QR code. When the determination is affirmative, the routine proceeds to step 1210 for storing the combination of the coordinates of this X, Y, Z in a predetermined region of the memory 938, and proceeds to step 1212.

On the other hand, at step 1208, when the determination is negative, the routine proceeds to step 1212 without performing the processing of step 1210 at this time point.

Here, when the three position detection patterns 52A, 52B, 52C constituting one QR code 50 are connected to one another with a line, a right angled isosceles triangle having right angle of BAC is formed (see a dotted line in FIG. 34A and T1 in FIG. 35). On the other hand, when the three position detection patterns 52 including a position detection pattern 52 of a different QR code 50 are connected to one another with a line, a right angled isosceles triangle is often not formed as shown by T2 and T3 in FIG. 35.

Thus, in the present embodiment, a combination of three position detection patterns that if connected to one another with lines, form a right angled isosceles triangle is regarded as the position detection patterns 52 constituting the same QR code.

Figure 37:
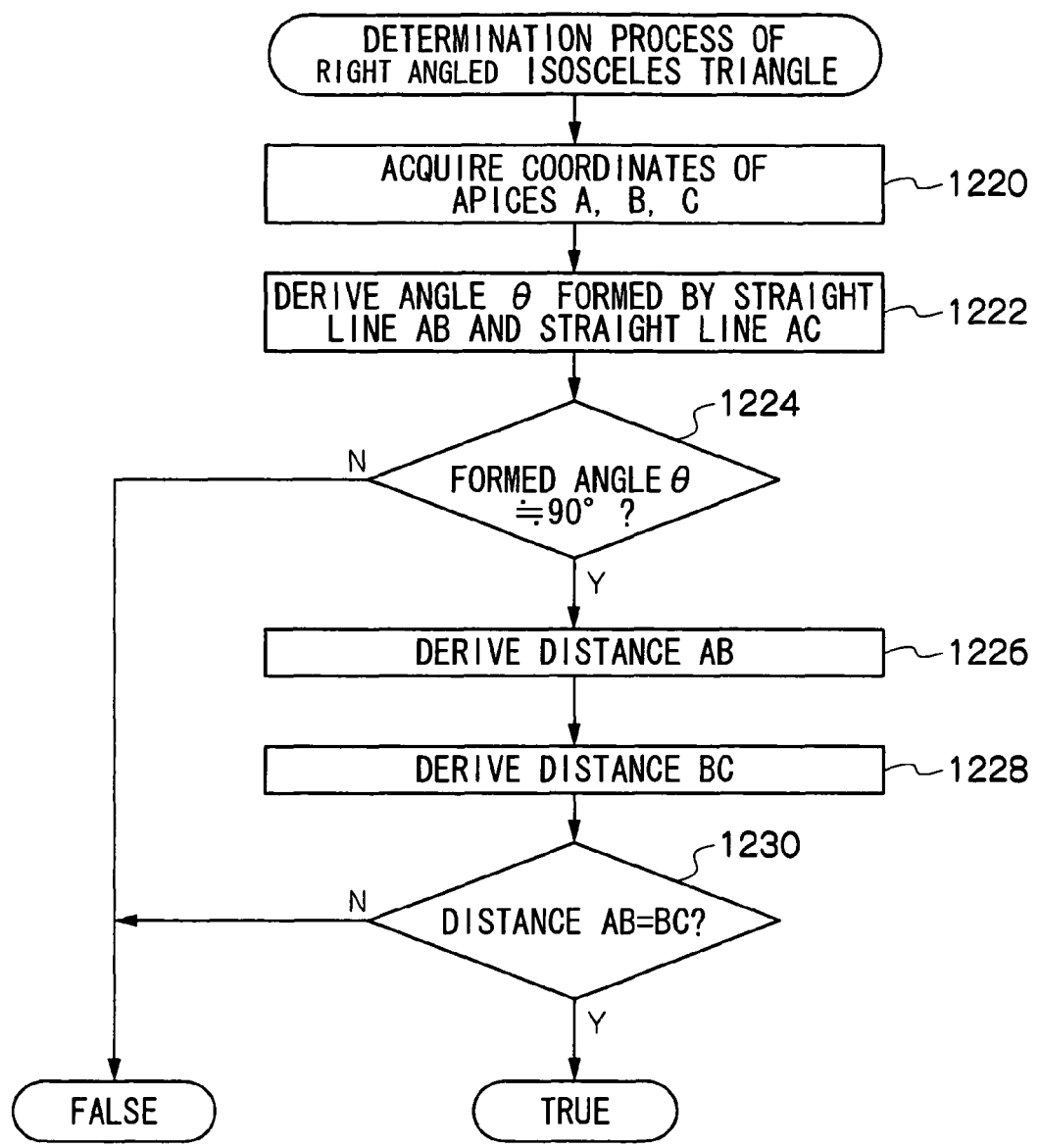
FIG. 37 is a flowchart illustrating a flow of a determination process for right angled isosceles triangle that is performed by a detection process program pertaining to the fourth embodiment.

FIG. 37 illustrates a flow of a determination process of right angled isosceles triangle that is performed at the above-mentioned step 1208. Here, with reference to the drawing, the determination process of right angled isosceles triangle according to the present embodiment will be described.

First, at step 1220, into apex coordinates of a triangle ABC obtained by connecting the position detection patterns 52A, 52B, 52C with a line, the center coordinates set as above-described X, Y, Z are substituted, respectively. At the next step 1222, an angle θ formed by a straight line AB and a straight line AC is derived, and thereafter the routine proceeds to step 1224.

At step 1224, it is determined whether the angle θ is substantially 90°. When the determination is affirmative, it is determined that there is a possibility that the triangle ABC is a right angled isosceles triangle having right angle of BAC, and the routine proceeds to step 1226.

The reason why the angle θ is specified to be substantially 90° is that a positional deviation of the center coordinates resulting from the reading accuracy can be envisaged, and the tolerances therefor can be set as appropriate.

On the other hand, when the determination is negative at step 1224, the triangle is not a triangle having a right angle of BAC, thus a false determination is given, and at step 1208 (see FIG. 36) of the QR code detection process, a negative determination is given.

At step 1226, a distance AB is derived, and at the next step 1228, a distance BC is derived. Thereafter, the routine proceeds to step 1230 for determining whether the distance AB=BC. When the determination is affirmative, this triangle ABC is a right angled isosceles triangle having a right angle of BAC. Therefore, a true determination is given, and at step 1208 (see FIG. 36) of the QR code detection process, an affirmative determination is given.

At step 1212 in FIG. 36, the center coordinates which are listed up next to the center coordinates set as Z at this time are reset as Z, and the routine returns to step 1206. This processing of step 1206 to step 1212 is repeated twelve times when twelve center coordinates are listed up.

Thereafter, when all of the center coordinates listed up are set as Z, and the processing of step 1206 to step 1212 is terminated, the routine proceeds to step 1214. At step 1214, the center coordinates of Y are altered to the next values in the list. The routine returns to step 1204, all of the center coordinates are sequentially set as Z, and the processing of step 1206 to step 1212 are repeated.

In this manner, when all of the center coordinates listed up are set as Y, and the processing of step 1204 to step 1214 being terminated, the routine proceeds to step 1216. At step 1216, the center coordinates of X are altered to the next values in the listed. The routine returns back to step 1202, all of the center coordinates are sequentially set as Y, and the processing of step 1204 to step 1214 are repeated.

Thereby, when every combination of center coordinates listed up has been hypothesized to be a position detection pattern of a QR code in all the permutations possible, and it has been determined whether the combination constitutes position detection patters within the same QR code, then the present QR code detection process is terminated.

Thereby, on the basis of the combinations of X, Y, Z that are stored in the memory 938, an image region representing a QR code is identified as appropriate, and on the basis of the image in the image region, the decoding process is carried out.

As described above in detail, according to the present embodiment, in order to identify the position and angle of a square two-dimensional code, the contrast pattern of the position detection pattern which is disposed at three corners of the square is stored in advance in the storage section. And, on the basis of the read image data obtained by reading the document, all of the image regions which match the contrast pattern are identified. Of all the identified image regions, three image regions with which a figure obtained by connecting the centers thereof with one another by a line is a right angled isosceles triangle are determined to be the position detection patterns of a two-dimensional code, respectively, and the region represented by the three position detection patterns is detected as a two-dimensional code.

Fifth Embodiment

In the fourth embodiment as described above, an embodiment in which every combination with which a figure produced by connecting the center coordinates of the position detection patterns to one another by a line is a right angled isosceles triangle is detected as the combinations of the position detection patterns of the QR code has been explained. In the present fifth embodiment, an embodiment in which the combination of the position detection patterns of the QR code that meets the previously inputted condition of size is detected will be explained.

In the present fifth embodiment, as the condition of size of the QR code to be detected, a rate of a length of one edge of the QR code region to a length e of the short side of the read image region is equal to or lower than N % may be previously inputted, and on the basis of the condition, the detection process for the QR code is performed.

Thus, in the present fifth embodiment, instead of the determination process of right angled isosceles triangle (see FIG. 37) in the fourth embodiment as described above, a determination process of right angled isosceles triangle considering the condition of size of a QR code is performed.

FIG. 38 illustrates a flow of the determination process of right angled isosceles triangle considering the condition of size of a QR code. Here, with reference to the same drawing, the determination process for right angled isosceles triangle according to the present fifth embodiment will be described.

First, at step 1240, into the apex coordinates of the triangle ABC obtained by connecting the position detection patterns 52A, 52B, 52C with a line, the center coordinates set as above-described X, Y, Z are substituted, respectively. At the next step 1242, the angle θ formed by the straight line AB and the straight line AC is derived, and thereafter the routine proceeds to step 1244.

At step 1244, it is determined whether the formed angle θ is substantially 90°. When the determination is affirmative, it is determined that there is a possibility that the triangle ABC is a right angled isosceles triangle having a right angle of BAC, and the routine proceeds to step 1246.

The reason why the formed angle θ is specified to be substantially 90° is that a positional variation of the center coordinates resulting from the reading accuracy can be envisaged, and thus the tolerances therefor can be set as appropriate.

On the other hand, when the determination is negative at step 1244, the triangle is not a triangle having a right angle of BAC, thus a false determination is given, and at step 1208 (see FIG. 36) of the QR code detection process, a negative determination is given.

At step 1246, the distance AB is derived, and at the next step 1248, it is determined whether the derived distance AB is smaller than a threshold m (N % of e). When the determination is affirmative, the routine proceeds to step 1250 for deriving the distance BC, and thereafter proceeds to step 1252.

At step 1252, it is determined whether the derived distance BC is smaller than the threshold m (N % of e). In a case where the pertinent determination is affirmative, the routine proceeds to step 1254 for determining whether the distance AB=BC. When the pertinent determination is affirmative, this triangle ABC is a right angled isosceles triangle having a right angle of BAC, and which two isosceles sides are smaller than the threshold m. Therefore, a true determination is given, and at step 1208 (see FIG. 36) of the QR code detection process, an affirmative determination is given.

On the other hand, if the determination is negative at any one of step 1248, step 1252, and step 1254, this triangle ABC is not a right angled isosceles triangle having the right angle of BAC, and which two isosceles edges are smaller than the threshold m. Therefore, a false determination is given, and at step 1208 (see FIG. 36) of the QR code detection process, a negative determination is given.

As described above in detail, according to the present fifth embodiment, in order to identify the position and angle of a square two-dimensional code, the contrast pattern of the position detection pattern which is disposed at three corners of the square is stored in advance in the storage section. And, on the basis of the read image data obtained by reading the document, all of the image regions which match the contrast pattern are identified. Of all the image regions identified, the three image regions with which a figure obtained by connecting the centers thereof to one another by a line is a right angled isosceles triangle are determined to be the position detection patterns of a two-dimensional code, respectively, and the region represented by the three position detection patterns is detected as a two-dimensional code.

Further, according to the present fifth embodiment, the size of a right angled isosceles triangle obtained by connecting the centers with a line is set in advance. And, the three image regions which provide a right angled isosceles triangle and meet the condition of the size are specified to be the position detection patterns of the two-dimensional code, respectively.

Sixth Embodiment

In the fifth embodiment as described above, an embodiment in which the combination of the position detection patterns of a QR code meeting the condition of size, which is inputted in advance, is detected has been explained. In the present sixth embodiment, an embodiment in which the combination of the position detection patterns of a QR code in which the rotated angle with respect to the read image region, instead of the size of a QR code, meets a predetermined requirement is detected will be explained.

Figure 39A:
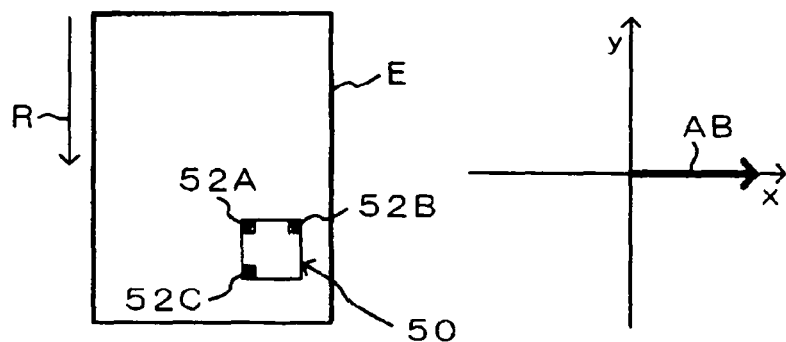
FIG. 39A to FIG. 39D are explanatory drawings illustrating a state of the read image and the QR code with respect to the document reading direction R.

Here, as shown in FIG. 39A to FIG. 39D, depending upon the orientation of setting of the document with respect to the reading direction R, the obtained read image varies. FIG. 39A shows a case where the top and bottom of the document image matches the top and bottom of the read image. In this case, the QR code 50 included in the read image is read in the state in which it is not rotated.

Figure 39B:
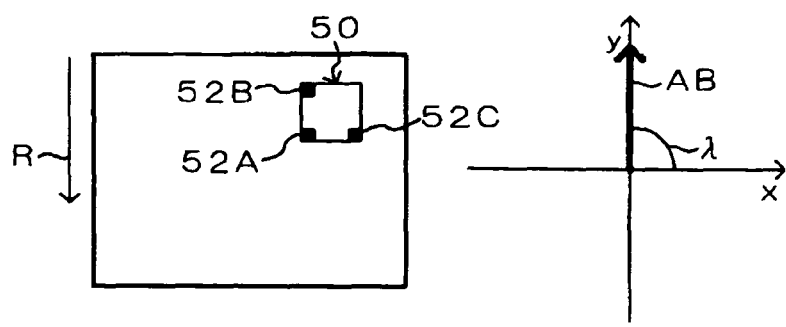

In addition, in FIG. 39B, the document is read in a state of being rotated by 90° with respect to the reading direction R, and the QR code 50 included in the read image is also read in a state of being rotated by 90°.

Figure 39C:
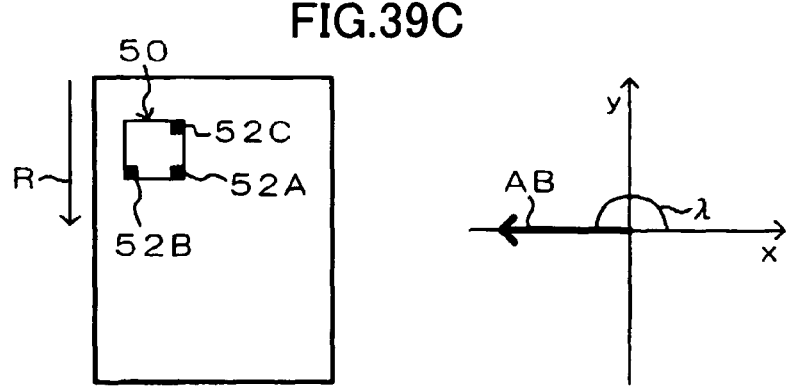
Figure 39D:
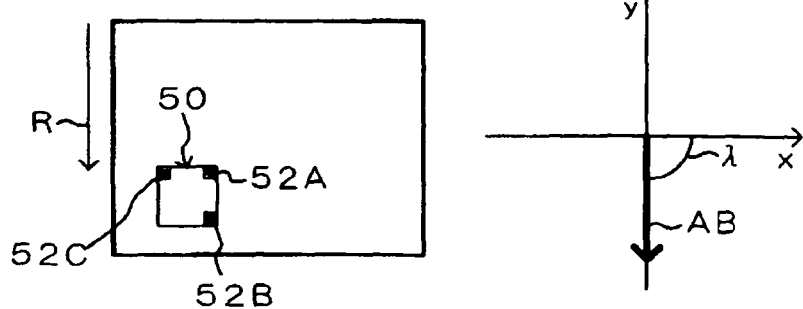

Likewise, in FIG. 39C, the document is read in a state of being rotated by 180° with respect to the reading direction R, and the QR code 50 included in the read image is also read in a state of being rotated by 180°. In addition, in FIG. 39D, the document is read in a state of being rotated by −90° with respect to the reading direction R, and the QR code 50 included in the read image is also read in a state of being rotated by −90°.

Thus, generally in the multi-function machine 910, although there is a possibility that the QR code 50 is read in a state of being rotated in units of 90°, it is quite unlikely that the QR code is read in a state of being rotated by, for example, 30°, 100°, or an angle other than the units of 90°.

Thus, in the present sixth embodiment, the combination of the position detection patterns 52A, 52B, 52C which the rotated angle with respect to the read image region E is any one of those shown in FIG. 39A to FIG. 39D is detected.

Figure 40:
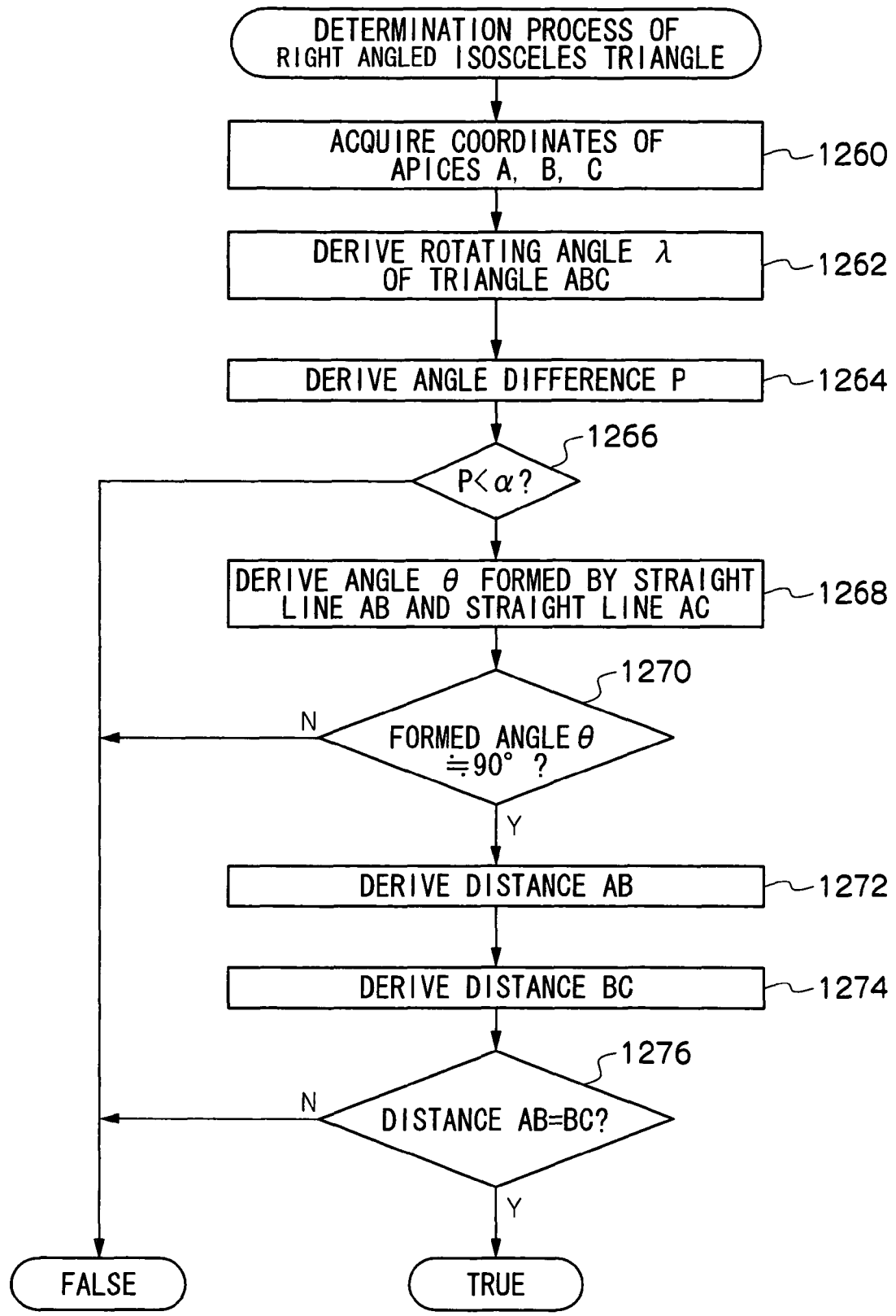
FIG. 40 is a flowchart illustrating a flow of a determination process for right angled isosceles triangle considering a condition of rotation angle of a QR code that is performed by a detection process program pertaining to the sixth embodiment.

FIG. 40 illustrates a flow of a determination process of right angled isosceles triangle considering a condition of rotated angle of a QR code. Here, with reference to the same drawing, the determination process of right angled isosceles triangle according to the present sixth embodiment will be described.

First, at step 1260, into the apex coordinates of the triangle ABC obtained by connecting the position detection patterns 52A, 52B, 52C with a line, the center coordinates set as the above-mentioned X, Y, Z are substituted, respectively. At the next step 1262, a rotated angle λ of the triangle ABC is derived.

Here, assuming that the vector AB connecting the apex A and the apex B as shown in FIG. 39A is the reference vector, the rotated angle λ corresponds to the angle formed by the reference vector and the vector AB derived from the actually set apex coordinates.

At the next step 1264, an angle difference P between the rotated angle which the QR code may take and the actual rotated angle λ is derived, and thereafter the routine proceeds to step 1266. In the present embodiment, since the rotated angle which can be taken by the QR code 50 is set at an angle in units of 90°, the remainder given from dividing the rotated angle λ by 90° is considered as the angle difference P. For example, in a case where the rotated angle λ is 120°, the angle difference P is 30°.

At step 1266, it is determined whether the angle difference P is smaller than a predetermined value α (3° in the present embodiment). When the determination is affirmative, the routine proceeds to step 1268. The predetermined value α is a value which can be set, considering a displacement of the document with respect to the reading direction, and according to the accuracy of the automatic document feeding device 924, displacements that generally occur when a user sets a document in the reading position, and the like. As the predetermined value α, a value obtained by computer simulation or the like, on the basis of experiments using an actual machine or the specifications for the actual machine can be applied.

On the other hand, at step 1266, when the determination is negative, it is determined that the coordinates set as the coordinates of the apices of the triangle ABC do not form the position detection patterns 52A, 52B, 52C in the same QR code 50, thereby a false determination is given, and at step 1208 (see FIG. 36) of the QR code detection process, a negative determination is given.

In other words, by first determining whether the rotated angle meets a condition, the number of combinations of apices A, B, C for which the determining process of right angled isosceles triangle is to be performed in detail is reduced.

At step 1268, the angle formed between the straight line AB and the straight line AC is derived, and thereafter the routine proceeds to step 1270.

At step 1270, it is determined whether the angle formed is substantially 90°. When the pertinent determination is affirmative, it is determined that there is a possibility that the triangle ABC is a right angled isosceles triangle having a right angle of BAC, and the routine proceeds to step 1272.

The reason why the formed angle θ is specified to be substantially 90° is that a positional deviation of the center coordinates resulting from the reading accuracy can be envisaged, and thus the tolerances therefor can be set as appropriate.

On the other hand, when the determination is negative at step 1270, the triangle is not a triangle having a right angle of BAC. Thus, a false determination is given, and at step 1208 (see FIG. 36) of the QR code detection process, a negative determination is given.

The distance AB is derived at step 1272, the distance BC is derived at the next step 1274, and thereafter, the routine proceeds to step 1276.

At step 1276, it is determined whether the distance AB=BC. When the pertinent determination is affirmative, this triangle ABC is a right angled isosceles triangle having a right angle of BAC. Therefore, a true determination is given, and at step 1208 (see FIG. 36) of the QR code detection process, an affirmative determination is given.

On the other hand, at step 1276, when the determination is negative, although the angle BAC of this triangle ABC has right angle, this triangle ABC is not a right angled isosceles triangle. Therefore, a false determination is given, and at step 1208 (see FIG. 36) of the QR code detection process, a negative determination is given.

As described above in detail, according to the present sixth embodiment, in order to identify the position and angle of a square two-dimensional code, the contrast pattern of the position detection pattern which is disposed at three corners of the pertinent square is stored in advance in the storage section. And, on the basis of the read image data obtained by reading the document, all of the image regions which match the contrast pattern are identified. Of all the image regions identified, the three image regions with which a figure obtained by connecting the centers thereof with one another with a line is a right angled isosceles triangle are determined to be the position detection patterns of a two-dimensional code, respectively, and the region represented by the three position detection patterns is detected as a two-dimensional code.

Further, according to the present sixth embodiment, the angle of a right angled isosceles triangle obtained by connecting the centers with a line, with respect to the vertical direction of the read image data, is set in advance. The three image regions which form a right angled isosceles triangle and meet the condition of the angle are specified to be the position detection patterns of the two-dimensional code, respectively.

The configuration (see FIG. 32 and FIG. 33) of the multi-function machine 910 according to the embodiments as described above is one example, and may, of course, be appropriately modified within the scope and concept of the present invention.

In addition, the flows of the processes according to the present embodiment (see FIG. 36 to FIG. 38 and FIG. 40) are respective examples, and may, of course, be appropriately modified within the scope and concept of the present invention.

For example, the present invention may be embodied such that, the region where the two-dimensional code is to exist is set in advance in the read image data.

In addition, the present invention may be embodied such that the number of two-dimensional codes included in the read image data is set in advance. In this case, at the time when right angled isosceles triangles have been detected by the number of two-dimensional codes that has been set in advance, the processing can be terminated.

Further, the present invention may be embodied such that the condition of the size, the rotated angle thereof, the existence region, and the number of the QR codes can be appropriately set in combination.

The invention may be embodied such that, the conditions of size, rotation angle, existence region, number of QR codes, and the like, are input by the user according to the document to be read through the operation section 920 at the time of reading of the document. Further, the conditions may be set and stored in advance in the memory 938 of the multi-function machine 910, or the like.

In the present fourth to sixth embodiment, embodiments in which the present invention has been applied to the multi-function machine 910 have been explained. However, the present invention is not limited to application to the multi-function machine 910, and is, of course, applicable to general image readers, such as copying machines, scanners, and the like.

What is claimed is:

1. A method for detecting a two-dimensional code of three position detection patterns provided in positions corresponding to respective apices of a right angled isosceles triangle, and a data region is provided in a region defined by the position detection patterns, the method comprising:
   detecting a plurality of position detection patterns included in an image;
   identifying positions of the center points of the detected position detection patterns;
   detecting groups of three center points, the three center points of each group constituting apices of a corresponding right angled isosceles triangle;
   detecting, from among the groups of three center points, combinations of three center points, the three center points of each combination being included in a corresponding same two-dimensional code from among the identified center point positions, by
      defining a candidate two-dimensional code region as a square formed by a combination of three center points,
      setting a virtual line that forms a square that is separated by a predetermined distance from an outer periphery of the candidate two-dimensional code region, and
      determining that a previously standardized blank region exists along the virtual line if the proportion of white pixels to the total number of pixels on the virtual line exceeds a threshold, and
      determining the combination of three center points that forms the candidate two-dimensional code region with the virtual line having the blank region being included in the corresponding same two-dimensional code; and
   determining the candidate two-dimensional code region in the combination of three center points included in the corresponding same two-dimensional code as a two-dimensional code region to be decoded.

2. The two-dimensional code detection method of claim 1, wherein the blank region is a region that exists around all four sides of the two-dimensional code region.

3. The two-dimensional code detection method of claim 2, wherein a virtual line is set that is separated by a predetermined distance from the outer periphery of the two-dimensional code region in a region around all four sides of the two-dimensional code region, and if the proportion of white pixels to the total number of pixels on the virtual line exceeds a threshold a region is determined to be a blank region.

4. The two-dimensional code detection method of claim 3, wherein the threshold is a value which is determined according to a symbol size of the two-dimensional code.

5. The two-dimensional code detection method of claim 1, wherein the threshold value is a value which is determined according to a symbol size of the two dimensional code.

6. The two-dimensional code detection method of claim 2, wherein a virtual region inside by a predetermined distance from the outer periphery of the two-dimensional code region is set in a region around all sides of the two-dimensional code region, and when the proportion of white pixels to the total number of pixels in the virtual region exceeds a threshold it is determined to be a blank region.

7. The two-dimensional code detection method of claim 6, wherein the threshold is a value which is determined according to a symbol size of the two-dimensional code.

8. A method for detecting a two-dimensional code of three position detection patterns provided in positions corresponding to respective apices of a right angled isosceles triangle, and a data region is provided in a region defined by the position detection patterns, the method comprising:
  detecting a plurality of position detection patterns included in an image;
  identifying positions of the center points of the detected position detection patterns;
  detecting groups of three center points, the three center points of each group constituting apices of a corresponding right angled isosceles triangle;
  detecting, from among the groups of three center points, combinations of three center points, the three center points of each combination being included in a correspondence same two-dimensional code from among the identified center point positions, by
    defining a candidate two-dimensional code region as a square formed by a combination of three center points,
    setting a virtual region inside by a predetermined distance from the outer periphery of the candidate two-dimensional code region,
    determining a previously standardized blank region exists in the virtual region if the proportion of white pixels to the total number of pixels in the virtual region exceeds a threshold region, and
    determining the combination of three center points that forms the candidate two-dimensional code region with the virtual region having the blank region being included in the corresponding same two-dimensional code; and
  determining the candidate two-dimensional code region in the combination of three center points included in the correspondence same two-dimensional code as a two-dimensional code region to be decoded.

9. The two-dimensional code detection method of claim 8, wherein the threshold is a value which is determined according to a symbol size of the two-dimensional code.

10. A two-dimensional code detection device for detecting a two-dimensional code of three position detection patterns provided in positions corresponding to respective apices of a right angled isosceles triangle, and a data region is provided in a region defined by the position detection patterns, the device comprising:
  a reference position identification section that detects the position detection patterns included in an image, and identifies center points of the detected position detection patterns;
  detecting groups of three center points, the three center points of each group constituting apices of a corresponding right angled isosceles triangle;
  a feature extracting section that detects, from among the groups of three center points, combinations of three center points, the three center points of each combination being included in a corresponding same two-dimensional code from among the identified center point positions identified by the reference position identification section, by being configured to:
    define a candidate two-dimensional code region as a square formed by a combination of three center points,
    set a virtual line that forms a square that is separated by a predetermined distance from an outer periphery of the candidate two-dimensional code region, and
    determine that a previously standardized blank region exists along the virtual line if the proportion of white pixels to the total number of pixels on the virtual line exceeds a threshold, and
    determine the combination of three center points that forms the candidate two-dimensional code region with the virtual line having the blank region being included in the corresponding same two-dimensional code; and
  a determination section that determines the candidate two-dimensional code region in the combination of three center points included in the corresponding same two-dimensional code as a two-dimensional code region to be decoded by the feature extraction section.

11. The two-dimensional code detection device of claim 10, further comprising a decoding section that decodes the two-dimensional code detected by the detection device.

12. The two-dimensional code detection device of claim 11, further comprising a position correction section that, before the decoding of the two-dimensional code by the decoding section, corrects a rotation position of the two-dimensional code such that pixel arrangement orientation of the two-dimensional code is parallel or orthogonal to a scanning direction.

13. A non-transitory storage medium storing a program to detect, by a computer, a two-dimensional code of three position detection patterns provided in positions corresponding to respective apices of a right angled isosceles triangle, and a data region is provided in a region defined by the position detection patterns, the program causing the computer to perform a two-dimensional code detection process comprising:
  detecting a plurality of position detection patterns included in a binary image;
  identifying positions of the center points of the detected position detection patterns;
  detecting groups of three center points, the three center points of each group constituting apices of a corresponding right angled isosceles triangle;
  detecting, from among the groups of three center points, combinations of three center points, the three center points of each combination being included in a corresponding same two-dimensional code from among the identified center point positions, by
    defining a candidate two-dimensional code region as a square formed by a combination of three center points,
    setting a virtual line that forms a square that is separated by a predetermined distance from an outer periphery of the candidate two-dimensional code region, and determining that a previously standardized blank region exists along the virtual line if the proportion of white pixels to the total number of pixels on the virtual line exceeds a threshold, and determining the combination of three center points that forms the candidate two-dimensional code region with the virtual line having the blank region being included in the corresponding same two-dimensional code; and determining the candidate two-dimensional code region in the combination of three center points included in the corresponding same two-dimensional code as a two-dimensional code region to be decoded.

14. A two-dimensional code detection method, comprising:

storing in a storage section in advance a contrast pattern of a position detection pattern that is disposed at three corners of a square;

identifying all image regions that match the contrast pattern on the basis of read image data obtained by reading a document; and detecting groups of three image regions from all of the identified image regions, the three image regions of each group constituting apices of a corresponding right angled isosceles triangle figure by connecting the centers thereof to one another with a line;

detecting, from among the groups of three image regions, combinations of three image regions, the three image regions of each combination being included in a corresponding same two-dimensional code, by defining a candidate two-dimensional code region as a square formed by a combination of three center points, setting a virtual line that forms a square that is separated by a predetermined distance from an outer periphery of the candidate two-dimensional code region, and determining that a previously standardized blank region exists along the virtual line if the proportion of white pixels to the total number of pixels on the virtual line exceeds a threshold, and determining the combination of three center points that forms the candidate two-dimensional code region with the virtual line having the blank region being included in the corresponding same two-dimensional code; and detecting, for each of the combinations, a region specified by the three position detection patterns as the two-dimensional code.

15. The two-dimensional code detection method of claim 14, further comprising setting in advance the size of the right angled isosceles triangle obtained by connecting the centers to one another with a line.

16. The two-dimensional code detection method of claim 14, further comprising setting in advance an orientation angle of the right angled isosceles triangle obtained by connecting the centers to one another with a line to a vertical direction of the read image data.

17. The two-dimensional code detection method of claim 14, further comprising setting in advance a region where the two-dimensional code exists in the read image data.

18. The two-dimensional code detection method of claim 14, further comprising setting in advance a number of two-dimensional codes included in the read image data.

19. A two-dimensional code detection device, comprising:

a storage section that stores in advance a contrast pattern of a position detection pattern that is disposed at three corners of a square;

a position detection pattern identifying section that, on the basis of read image data obtained by reading a document, identifies all image regions that match the contrast pattern; and a group detection section that detects groups of three image regions, the three image regions of each group constituting apices of a corresponding right angled isosceles triangle figure by connecting the centers thereof to one another with a line;

a combination detection section that detects, from among the groups of three image regions, combinations of three image regions, the three image regions of each combination being included in a corresponding same two-dimensional code, by being configured to:

define a candidate two-dimensional code region as a square formed by a combination of three center points, set a virtual line that forms a square that is separated by a predetermined distance from an outer periphery of the candidate two-dimensional code region, and determine that a previously standardized blank region exists along the virtual line if the proportion of white pixels to the total number of pixels on the virtual line exceeds a threshold, and determine the combination of three center points that forms the candidate two-dimensional code region with the virtual line having the blank region being included in the corresponding same two-dimensional code; wherein the detect, for each of the combinations, a region specified by the three position detection patterns as the two-dimensional code.

* * * * *